US010893338B1

(12) United States Patent
Neill et al.

(10) Patent No.: US 10,893,338 B1
(45) Date of Patent: *Jan. 12, 2021

(54) METHOD FOR UNIFIED AD DELIVERY TO CONSUMER DEVICES WITHIN SERVICE PROVIDER NETWORKS

(71) Applicant: ZODIAC SYSTEMS, LLC, Hicksville, NY (US)

(72) Inventors: Richard Neill, Garrison, NY (US); Alexei Savguira, North York (CA); Valerii Grishin, Farmingville, NY (US); Leon Rivkin, Muttontown, NY (US)

(73) Assignee: ZODIAC SYSTEMS, LLC, Hicksville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,722

(22) Filed: Nov. 7, 2019

Related U.S. Application Data

(62) Division of application No. 15/940,916, filed on Mar. 29, 2018, now Pat. No. 10,536,755.

(Continued)

(51) Int. Cl.
*H04N 21/44* (2011.01)
*H04N 21/81* (2011.01)
(Continued)

(52) U.S. Cl.
CPC ..... *H04N 21/812* (2013.01); *H04N 21/23424* (2013.01); *H04N 21/44016* (2013.01); *H04N 21/64322* (2013.01)

(58) Field of Classification Search
CPC .......... H04N 21/812; H04N 21/23424; H04N 21/44016; H04N 21/64322
See application file for complete search history.

(56) References Cited

U.S. PATENT DOCUMENTS

| | | | |
|---|---|---|---|
| 8,676,900 B2* | 3/2014 | Yruski | G06Q 30/02 705/14.1 |
| 2009/0031339 A1* | 1/2009 | Pickens | G06Q 30/0244 725/32 |

(Continued)

OTHER PUBLICATIONS

Office Action dated Mar. 21, 2019 for U.S. Appl. No. 15/940,916, filed Mar. 29, 2018.

(Continued)

*Primary Examiner* — Pankaj Kumar
*Assistant Examiner* — Alexander Boyd
(74) *Attorney, Agent, or Firm* — Lawrence G. Fridman, Esq.; Feigin & Fridman, LLC

(57) ABSTRACT

A method for ad delivery placements to consumer devices within managed service provider networks comprising the following steps is provided. providing Real-time, targeted video advertisements delivery to at least one consumer device is provided across multiple content delivery services accessible to viewers. A unified system capable of simultaneous targeting and delivery of a video advertisement is supported across multiple content delivery platforms to one more consumer devices. Delivery of the targeted video advertisements is supported to managed service provider devices. Efficient IP delivery of video advertisements is supported to service provider managed networks of consumer devices. Real-time targeted advertisements to all IP connected devices and managed consumer devices are supported based on targeting criteria.

13 Claims, 28 Drawing Sheets

Related U.S. Application Data

(60) Provisional application No. 62/478,311, filed on Mar. 29, 2017.

(51) Int. Cl.
*H04N 21/643* (2011.01)
*H04N 21/234* (2011.01)

(56) References Cited

U.S. PATENT DOCUMENTS

| | | | |
|---|---|---|---|
| 2010/0325657 A1* | 12/2010 | Sellers | H04N 21/23424 |
| | | | 725/32 |
| 2011/0107379 A1* | 5/2011 | Lajoie | H04L 65/1023 |
| | | | 370/389 |
| 2018/0131975 A1* | 5/2018 | Badawiyeh | H04N 21/23424 |

OTHER PUBLICATIONS

List of References for U.S. Appl. No. 15/940,916, filed Sep. 11, 2019.

\* cited by examiner

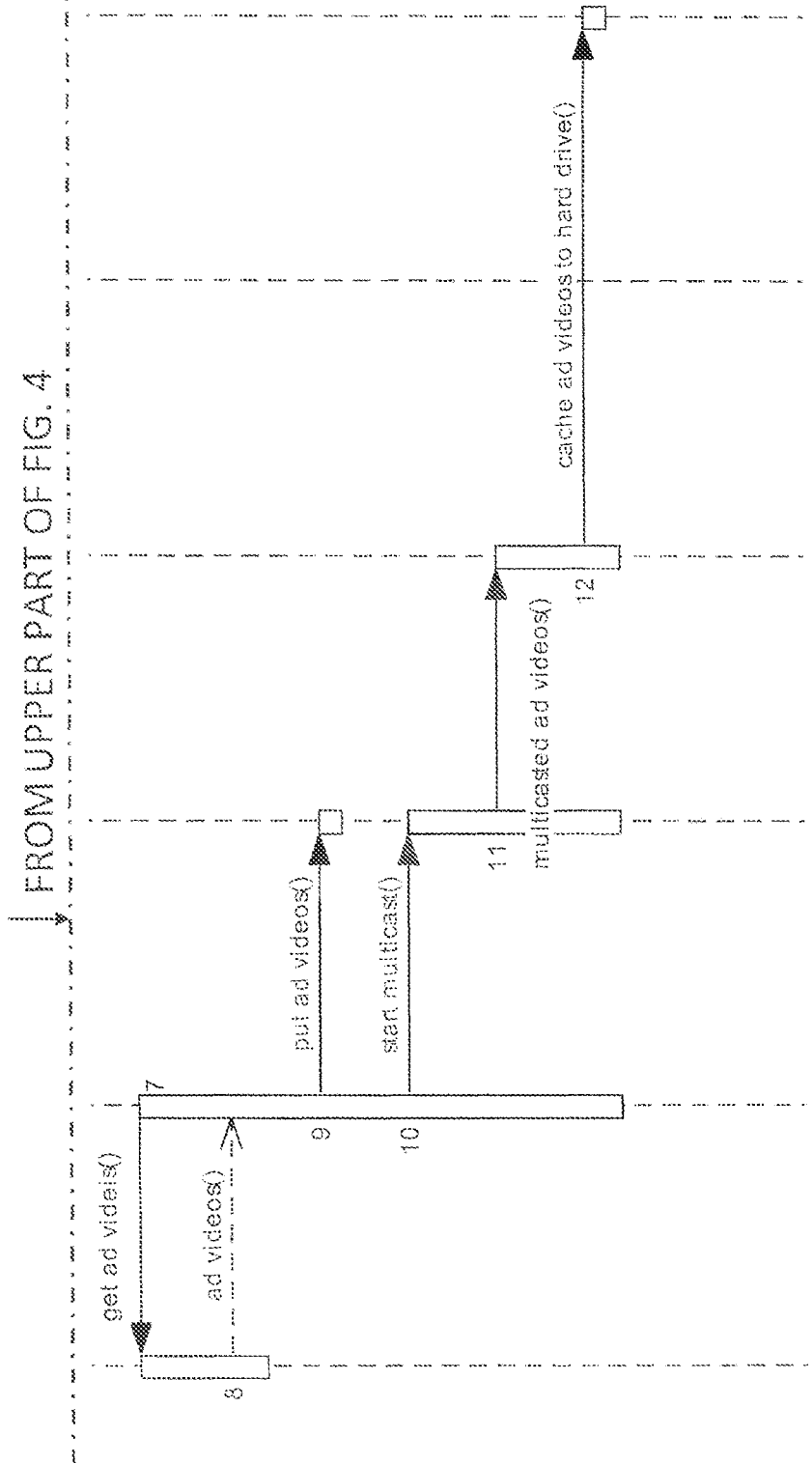

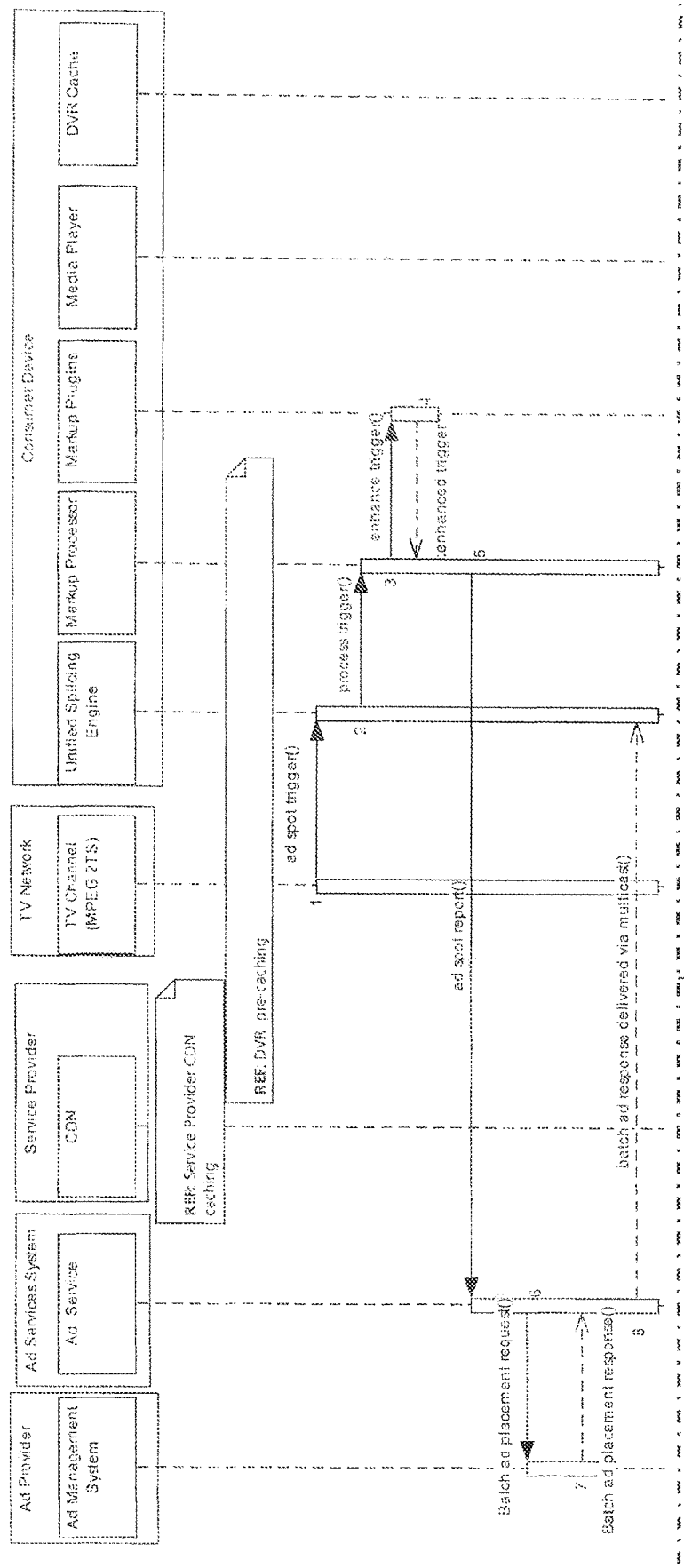
FIG. 5A ↓ TO LOWER PART OF FIG. 5

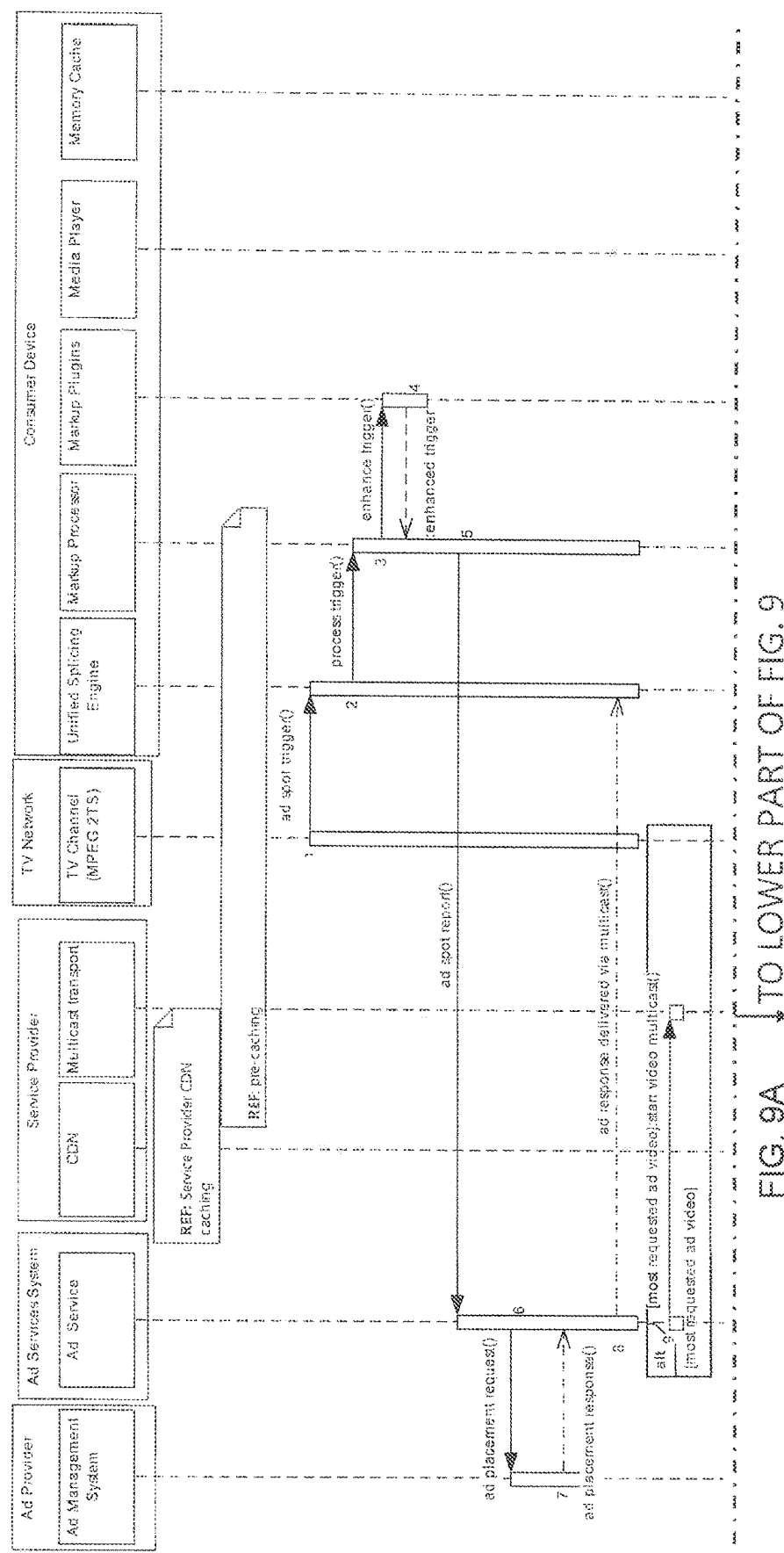
FIG. 9A ↓TO LOWER PART OF FIG. 9

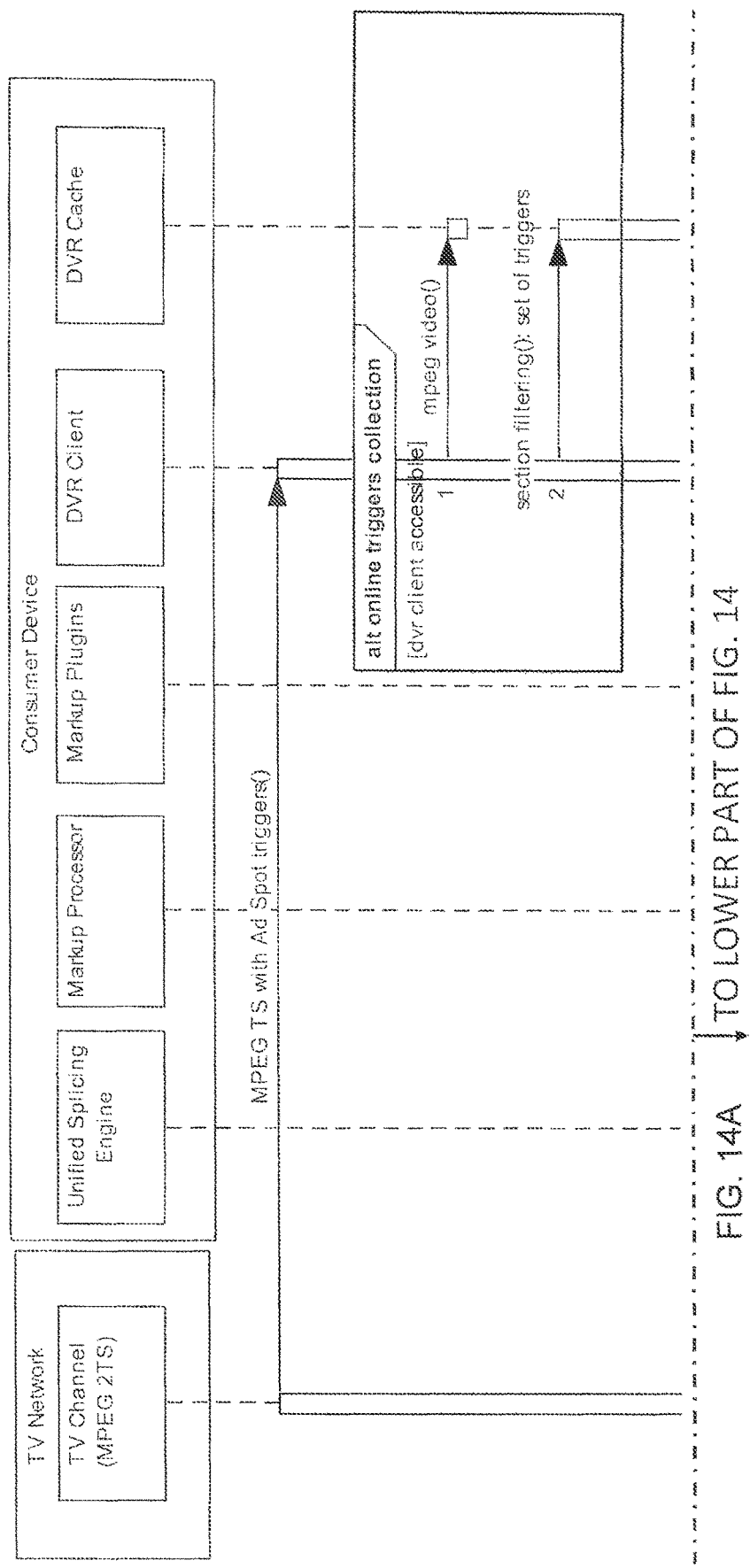
FIG. 14A  ↓ TO LOWER PART OF FIG. 14

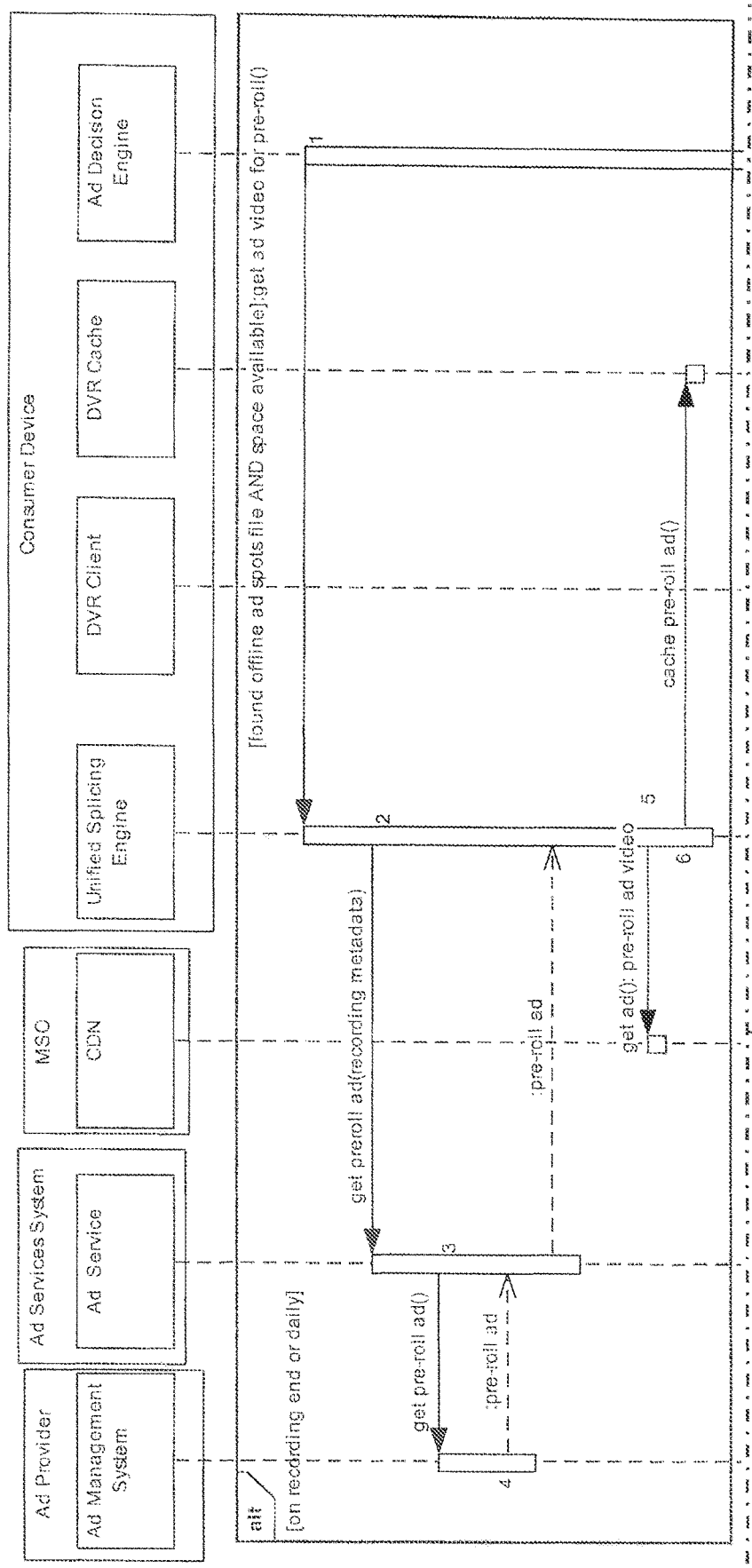
FIG. 15A  ↓TO LOWER PART OF FIG. 15

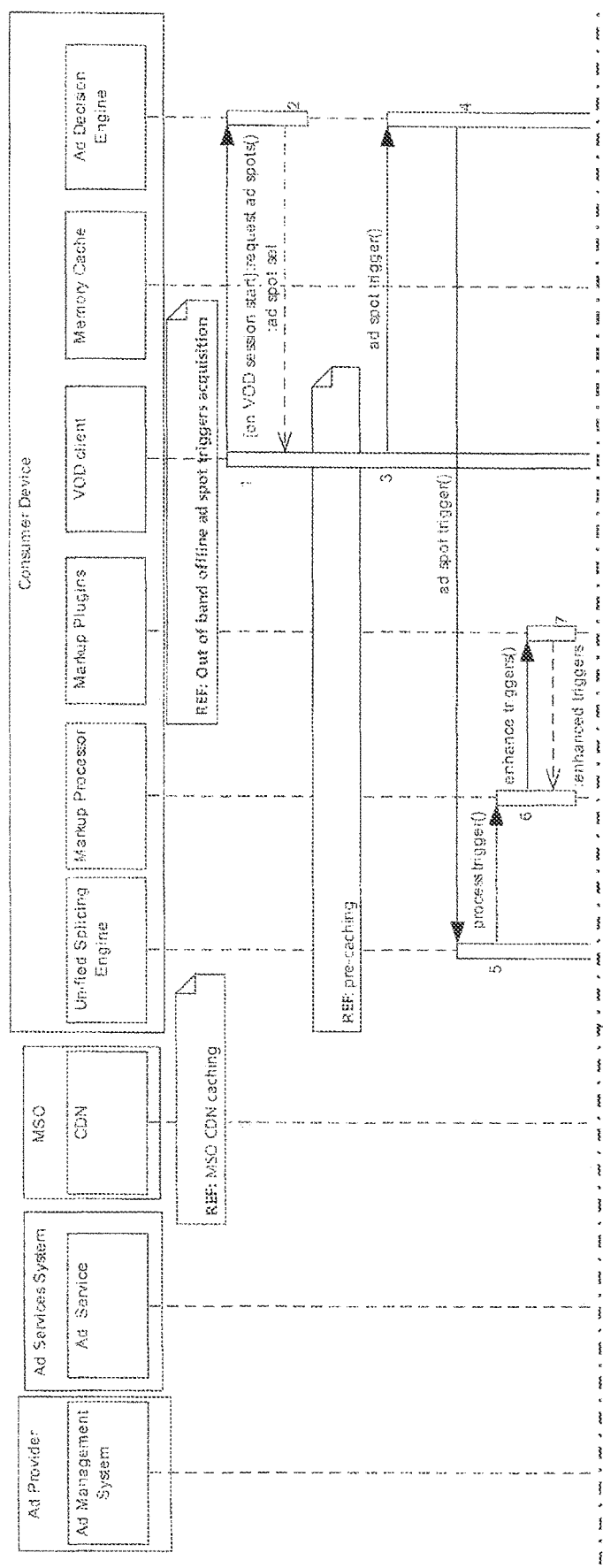
FIG. 19A ↓ TO LOWER PART OF FIG. 19

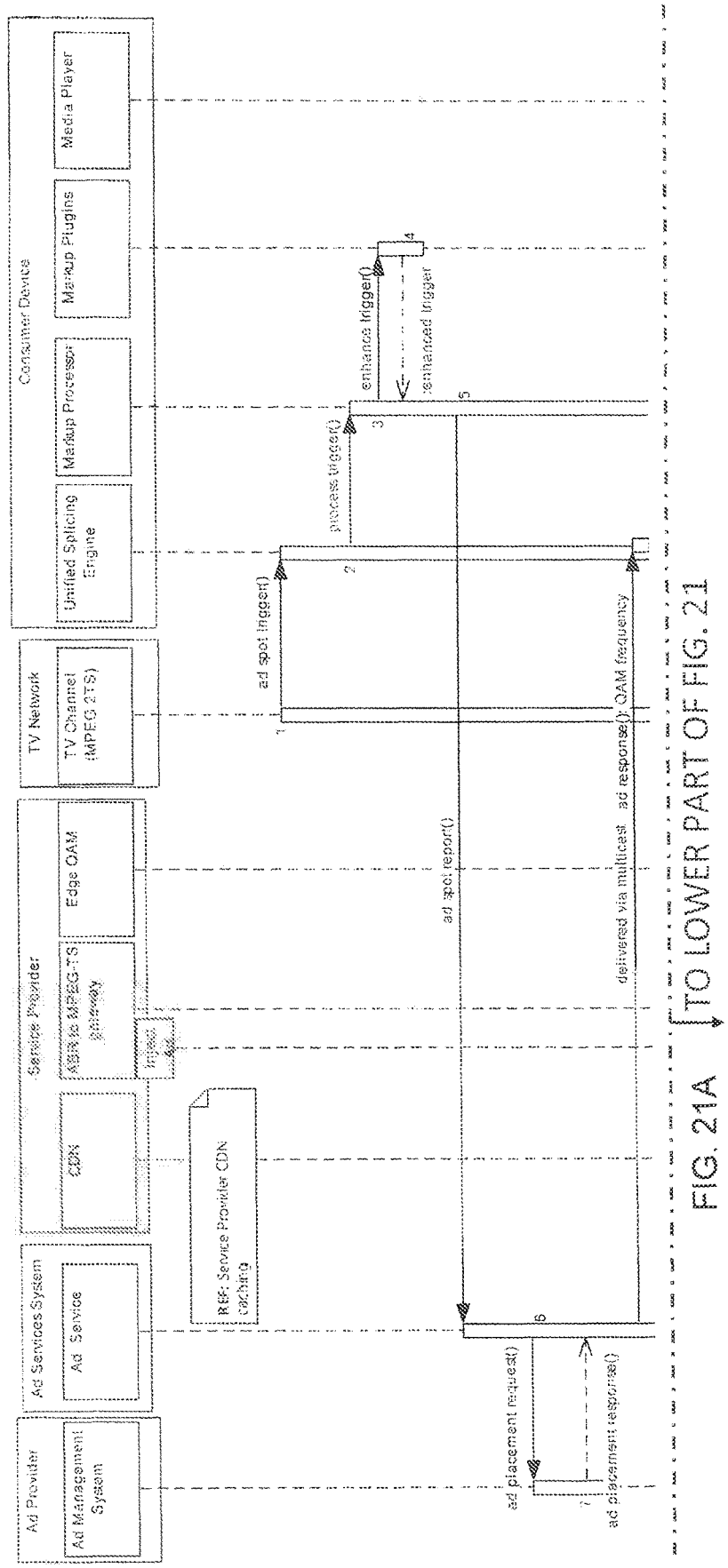
FIG. 21A [TO LOWER PART OF FIG. 21]

METHOD FOR UNIFIED AD DELIVERY TO CONSUMER DEVICES WITHIN SERVICE PROVIDER NETWORKS

REFERENCE TO RELATED APPLICATION

This Application is a Divisional Application of currently pending application Ser. No. 15/940,916 filed Mar. 29, 2018, which claims priority of U.S. Provisional Application Ser. No. 62/478,311 filed Mar. 29, 2017, the entire disclosure of both Applications is hereby incorporated by reference.

BACKGROUND OF THE INVENTION

Video advertisement has become a major part of the today's television experience. Video Ads are inserted in the designated time slots during live broadcast, captured and reproduced with video recorders along with the content video, inserted into video-on-demand playout, and into playback of the recorded videos, as well as used in other applications.

All these applications create a substantial advertisement market with high demand across advertising landscape, and as such require mature technologies. Several technologies have emerged to support the above-discussed applications and to address the market needs. These technologies are targeted at supporting a very limited number of applications. Currently available technologies are not capable of supporting great number or all possible applications simultaneously. Furthermore, each existing technology of inserting video advertisements into a content video is differently evolved to support custom or standard compliant advertisement management systems, analytics systems, targeted advertisement, video resolution and other aspects.

Present invention is aimed to unify the insertion of the video advertisement into the content video by engaging various technics including (but not limited to): Abstracting from specific advertisement management system, be it custom or standard; Supporting video advertisement insertion into wide variety of content videos including live broadcast, recorded videos (DVR, PVR, Network DVR), video on demand (VOD), pay per view (PPV), over the top (OTT); Abstracting from currently known methods of delivery of the content video and thus creating and plug-in based approach of supporting future methods of delivery of content video; Supporting granular targeted delivery of the inserted video advertisements; and Targeting supports targeted device groups of any size including individual targeting.

SUMMARY OF THE INVENTION

The present invention discloses a system for multiple ad delivery placements to consumer devices in a unified method within managed service provider networks. Consumer devices may be set-top boxes or any device on a network that is capable of video content display. The present invention enables delivery and insertion into video content of advertisements. Advertisements may be delivered and inserted into any combination of broadcast or linear TV networks, video-on-demand (VOD) content streams, DVR capable boxes with local storage, Cloud based DVR content streams, Live-to-VOD recordings (also known as Catch Up TV), and streams delivered over IP networks inclusive of OTT (over-the-top) streaming services (OTT or IP streaming services are those content service types as delivered by Amazon Prime Video, Netflix, and YouTube as representative examples) through a common, unified system design enabled by the present invention. The system enables the delivery of targeted advertisements to one or more consumer devices such as set-top boxes where ad content is intelligently delivered (through one or more mechanisms) to the set-top boxes from an IP network based on targeting criteria determined by a third-party ad management system. Additionally, the system is able to support targeted advertisements based on targeting criteria determined by analyzing data collected across both the IP connected devices outside the service provider network and/or those devices within the service provider network.

The system of the present Invention is capable of performing the following functions:

Providing real-time, targeted video advertisements delivery to one or more consumer devices across multiple content delivery services accessible to viewers individually or concurrently.

Supporting a unified system that can simultaneously target video advertisement delivery across linear-TV, DVR based devices, Video-On-Demand (VOD), Cloud based DVR or network DVR, and IP based delivery of content.

The system supports delivery of targeted video advertisements to managed service provider devices including those based on QAM, IP, QAM/IP, IP-only, set-top box devices with or without a local hard-drive, as well as any device with support for IP network connectivity operating within a service provider network.

The system supports efficient IP delivery of video advertisements to service provider managed networks of consumer devices where the network consists of both IP and QAM distribution systems and managed consumer devices.

The system supports real-time targeted advertisements to all IP connected devices and managed consumer devices, whose targeting criteria is based on data-collection and analytics across both managed service provider consumer devices and including, but not limited to Internet based devices such as mobile phones, tablets, personal computers, and more generally the IoT devices.

The system supports the insertion of video advertisements to large numbers of consumer devices in a network and bandwidth efficient manner by intelligently 1) limiting the total number of requests made from consumer devices; and 2) managing the distribution of requests to minimize overall network and bandwidth requirements while supporting real-time advertisement decisioning, targeting, and insertion to consumer devices; and 3) enabling support of real-time ad requests from consumer devices through the use of predictive analysis of network traffic, usage patterns, and the use of intelligent scheduling methods including pre-staging of ad media assets.

BRIEF DESCRIPTION OF THE DRAWINGS

The drawings discussed below are provided to illustrate and not to limit the invention, wherein:

FIGS. 4A and 4B represent a diagram of Use-Case 1 illustrating Caching Operation Sequence.

FIGS. 5A and 5B represent a diagram of Use Case 1 illustrating Ad Impression Sequence.

FIGS. 9A and 9B represent a diagram of Use-Case 2: Live-TV ad insertion with IP-delivered ad assests (impression flow).

FIG. 1 is a diagram of Use-Case 3: Ad insertion into DVR and Live-to-VOD playout.

FIGS. 14A and 14B represent a diagram of Use-Case 4: ad insertion into playout of locally stored DVR recordings (acquisition of the ad spots).

FIGS. 15A and 15B represent a diagram of Use-Case 4: ad insertion into playout of locally stored DVR recordings (local caching and multicast transport).

19A and 19B represent a diagram of Use-Case 5: ad insertion into playout of premium VOD content (VOD playout impression).

Figure 20:
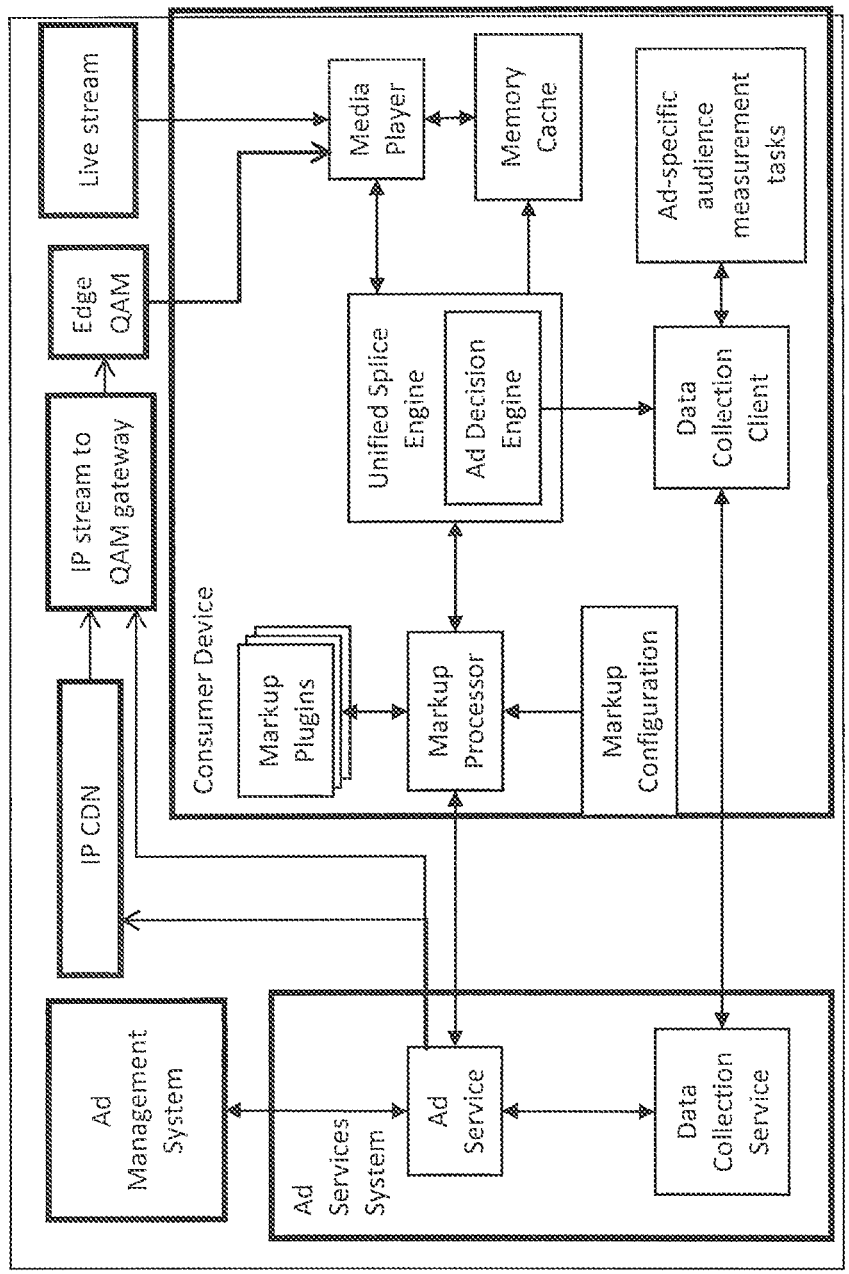

FIG. 20 is a diagram of Use-case 6 System Architecture: Live-TV Ad insertion with QAM delivered Ad assets.

Figure 21B:
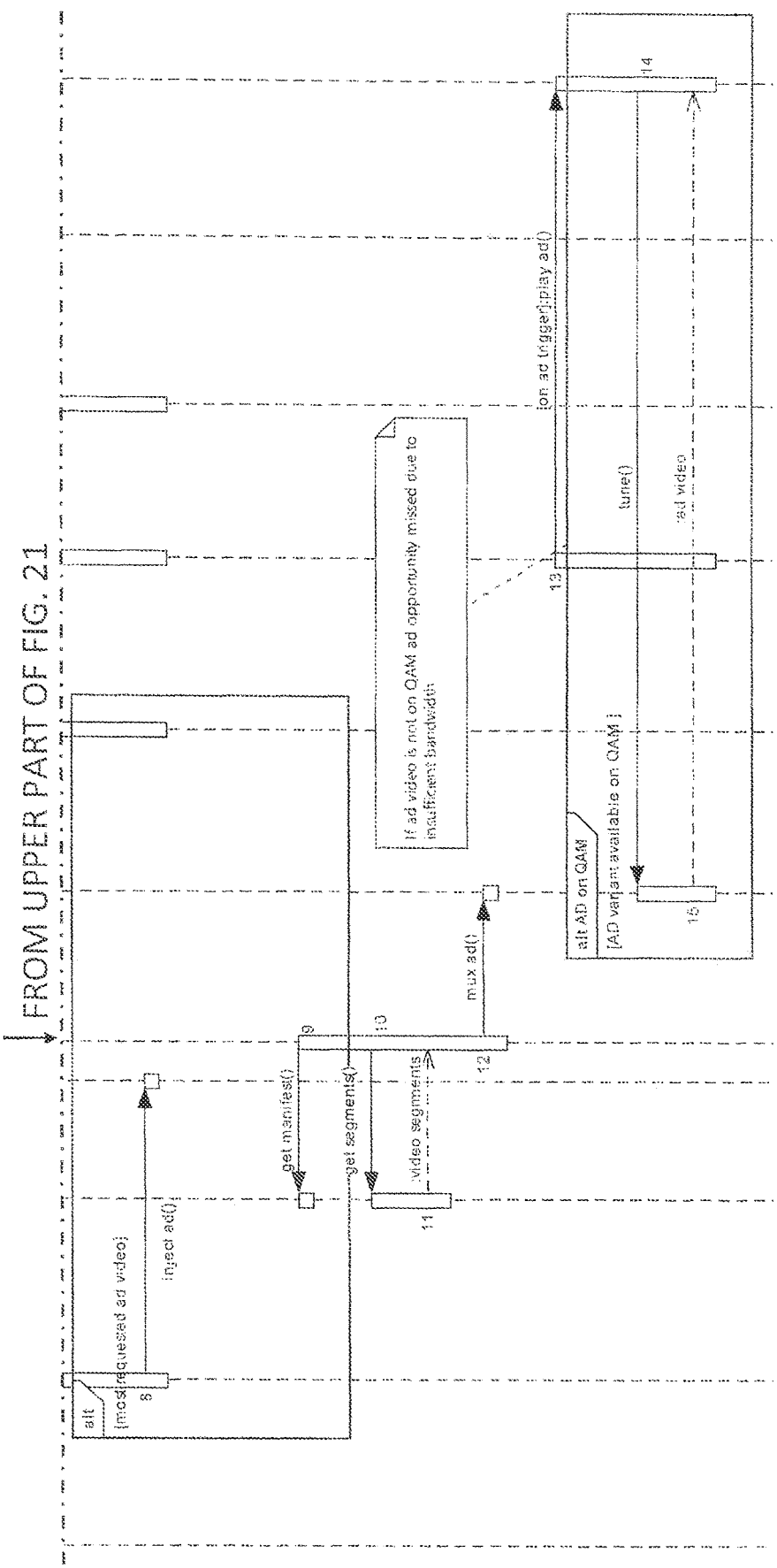

FIGS. 21A and 21B represent a diagram of Use-Case 6: Live-TV ad insertion with QAM delivered ad assets (impression flow).

DETAILED DESCRIPTION OF THE INVENTED TECHNOLOGY

Definitions

This section provides definitions of terms used to describe the invention. The terms defined here may not necessarily match definitions of the same or similar entities elsewhere.

Video (a content video) refers to a movie, program, sporting event, stream, etc. that constitutes the video that is specifically selected by the consumer.

Ad (an advertisement video) refers to a video that promotes a product or service to a consumer and that is shown to the consumer in addition to the content video. An ad video is herein specifically differentiated from a content video in that it is an advertisement system, not by a consumer, who selects a watch time for it.

System refers to a subject matter of the present invention.

Consumer Device is a device used or accessible to a consumer to watch content video.

CDN (Content Distribution Network) refers to an IP based network element that is used for storing and caching of video or ad media assets for efficient retrieval.

Delivery Technologies generally relates to a method of transferring a video from CDN or ad serving device to a consumer device. Currently supported delivery technologies are listed below. Supported delivery technologies are as follows:

QAM Quadruple Amplitude Modulation.
SDV—Switched Digital Video.
IP—Internet Protocol network.
DOCSIS—Data Over Cable Service Interface Specification.
Broadcast—delivery to the entire population of consumer devices.
Multicast—delivery to a subset of the entire consumer device population.
Unicast—individual delivery to a single consumer device.
Ethernet—Ethernet interface.
Wi-Fi—Wi-Fi interface.

Ad Spot refers to a timeframe within content video that is designated for displaying ad videos or streams. For the purpose of the description of the present invention, the following types of ad spots are defined: Live Ad Spot is an ad spot whose metadata is attached to a live broadcast and which arrives to a consumer device responsible for displaying a video only few seconds before an ad spot starts. Recorded Ad Spot is an ad spot whose metadata is stored in the system along with a recorded video the ad spot is associated with. If a live video is recorded and if its associated live ad spot is recorded too, then said associated live ad spot becomes a recorded ad spot. Generated Ad Spot is an ad spot whose metadata did not come to the system with an original video stream but is artificially generated by the system. A generated spot is first produced for a video when video is first displayed to the consumer. If a video is recorded by a consumer and its associated generated ad spot is recorded too, then said generated ad spot becomes a recorded ad spot.

Ad Spot Attributes refers to a set of attributes that characterize an ad spot. For the purpose of the present invention the term "Ad Spot Attributes" is used interchangeably with "Ad Spot Metadata".

The primary attributes of ad spot are start time, duration, origin, and other attributes available in the ad trigger signaling the ad spot. The start time attribute tells at which moment of time an ad spot starts related to a content video timeline. Duration tells how long a time frame allocated for the said ad spot is. The origin attribute refers to an origin that ad spot is associated with.

The extended attributes are provided by ad spot plugins on a consumer device and by the Ad Services system on the server side.

Ad Trigger refers to a designated markup associated with a video and that carries ad spot's primary attributes and event timing.

Ad Impression refers to a complete or incomplete playback of the individual ad video.

Video Sequence refers to a timed sequence of content video fragments and inserted ad videos rendered or displayed by a consumer device and consequently watched by a consumer.

Plugin refers to a software component that carries specific type of functionality and connects to a system using an interface exposed by a system. A said interface is specifically designed to provide said specific type of functionality to a system. From the perspective of a system all plugins that provide the same specific type of functionality are operating identically.

Pre-roll refers toad video inserted at the beginning of the content video. The content video starts after ad video playout is completed.

Mid-roll refers to ad video inserted in some middle of the content video. That is not in the beginning and not in the end. Each content video may have many mid-roll inserted ad videos.

Post-roll refers to ad video inserted at the end of the content video.

DAI refers to a digital ad insertion process which is disclosed by the method of the invention.

ADI refers to CableLabs Asset Distribution Interface.

General System Architecture

Figure 1:
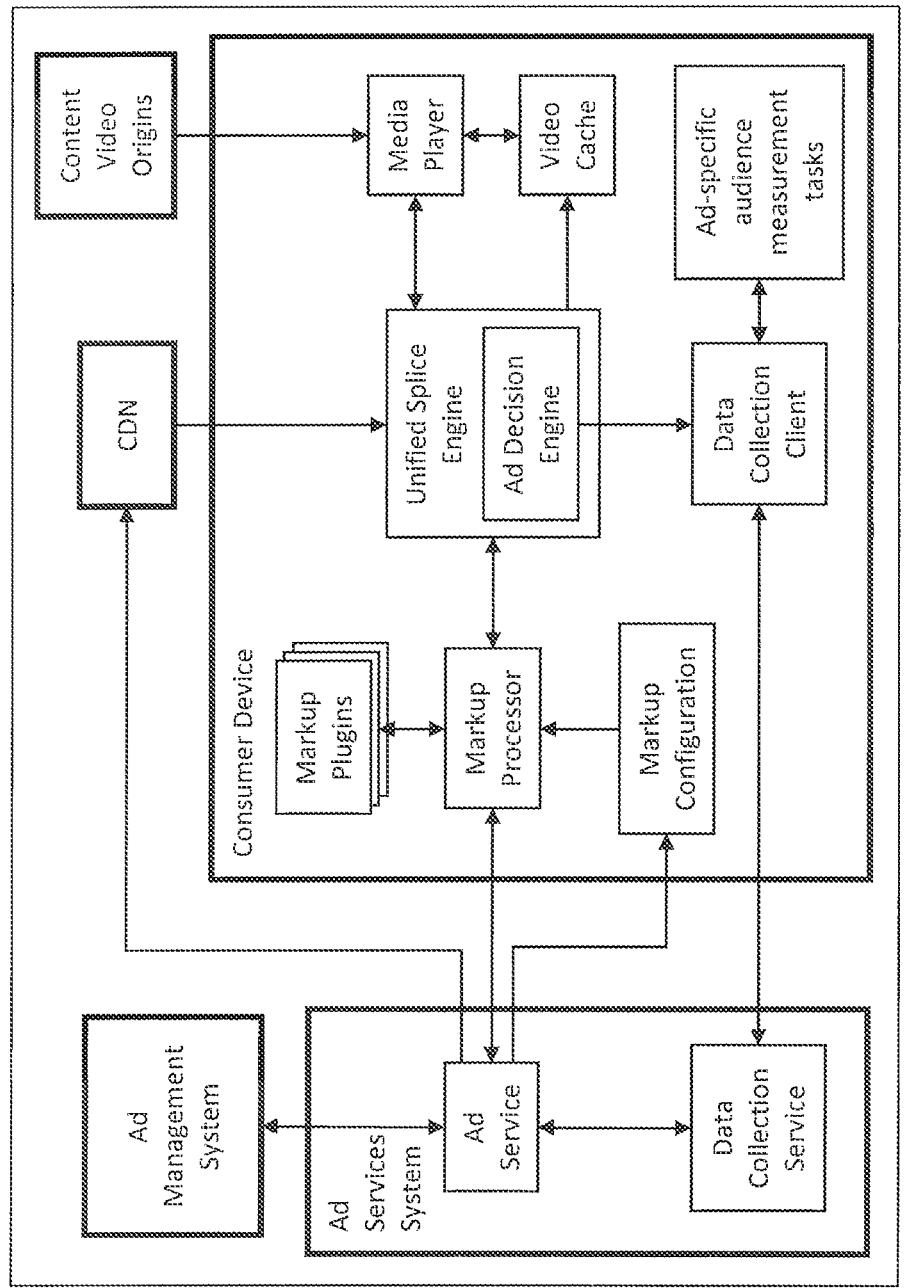
FIG. 1 is a diagram of general architecture of the system of the invention.

Reference is made to FIG. 1, which is a diagram of general architecture of the system of the invention. This figure represents the high-level system architecture with generic content source components such as "Origins" as opposed to specific use-case applications where each component is represented by its relevant instantiation such as CDN or TV VOD back-end as examples of more specific Origins further described below. Individual use-case applications are described below, with each use-case application described further by its associated system architecture and specific components replacing those illustrated in the generic components depicted in FIG. 1.

System Description

This section provides description of the components of the present invention depicted in the diagram of FIG. 1. Ad Management System is an external system responsible for advertisement campaign management, reporting, targeting and ad video selection to be displayed to a consumer. An Ad Management System does not constitute present invention and hence its function is not disclosed.

Ad Services System is a set of components and adapter modules providing advanced advertising services for a provider network of consumer devices. It is based on the AMS (Advanced Messaging Solution), a messaging and integration hub that hosts multiple components including components of the present invention. The AMS is a product of DevelopOnBox LLC d.b.a. Zodiac Interactive and is used in the diagram as an example host for server-side components. The Ad Services System supports the following functions of the present invention responsible for the following tasks:

Provisioning of the Markup Configuration to one or more Consumer Devices.

Adding server-side generated extended attributes to an ad spot metadata.

Processing and delivering ad placement requests from a Consumer Device to an Ad Management System.

Filtering out non-applicable ad videos and origins from the response of an Ad Management System.

Processing and Delivering responses from Ad Management System back to a Consumer Device.

Retrieving and processing impression statistics from Data Collection Service.

Reporting and processing impression statistics to Ad Management System.

Retrieving targeting criteria from Ad Management System.

Server-side pre-caching of ad videos for targeted consumer devices or groups.

Managing and controlling Consumer Device's ad video pre-caching behavior.

Seamless support of multiple Ad Management Systems simultaneously.

Integration to back-end Ad Management systems is through one or more plugins.

Plugins of the Ad Services System:

VAST

SCTE-130

Other methods of connecting to an Ad Management System can be enabled by implementing a corresponding plugin.

Multi-Service Data Collection Service is responsible for receiving data collection reports from Consumer Devices according to selection criteria or configuration rules. The Data Collection is used as a service supporting functionality of the present invention.

Origins (Content Video Origins) is a set of all supported source of content videos and/or ad videos. The block representing Origins on the diagram is intentionally positioned partially overlapping a Consumer Device in order to emphasize that Origin can be either in a Consumer Device or external to it. The present invention is agnostic to the physical placement of an Origin. For the purpose of description of the present invention, the Content Distribution Network, defined below, is an important embodiment of the Origin used as a part of ad video delivery mechanism and as such is shown separately. List of supported origins is provided below, wherein the origins are available to the system via corresponding origin plugin. The list is not exhaustive, and other origins can be enabled by providing respective origin plugin. Supported origins are as follows:

Linear, also known as Live TV is an origin that broadcasts videos to all interested consumers simultaneously at a time scheduled by a video network.

Video On Demand (VOD) is an origin that keeps a stock of recorded videos on the VOD servers and which allows a video to be watched at a time selected by consumer.

Digital Video Recorder (DVR), also known as Personal Video Recorder (PVR) is an origin that stores on a local hard drive previously recorded videos and that allows a video to be watched at a time selected by consumer.

Local storage is a storage device such as HDD, SSD, etc. closely associated with and controlled by a consumer device or by Ad Services System.

Network DVR (NDVR) is an origin that keeps previously recorded videos in the server or Cloud network and which allows a video to be watched at a time selected by consumer.

USB is a video that is available for displayed on a consumer device from another device that is connected to the said consumer devices via USB interface.

Catch-Up TV is an origin that keeps recently recorded linear video streams and allows a recorded video to be watched at a time selected by consumer.

RAM or Cache is a random access memory of a consumer device that may store video or portions or elements of video.

Flash is a flash memory of a consumer device.

CDN is a content delivery network that manages the efficient storage and distribution, responsible for video delivery, potentially in chunks to a consumer device over IP networks.

Web Service is any server or other device that can relate to a consumer device via IP network.

Cloud Service refers to any Cloud based infrastructure that can produce video streams via an IP network.

Unified Splice Engine is a core component of the present invention responsible for the Consumer Device side orchestration of all activities related to the processing of seamless splicing of one or more video origins, under the control of Ad Decision Engine and Markup processor, into a single video playout at designated time events. The unified splicing engine utilizes a video cache to optimize multi-origin video splice events and ensures proper temporal ordering of all video playout in conjunction with the Media player unit.

Ad Decision Engine is an internal component of the Unified Splice Engine responsible for selecting an exact ad video to be played at each specific ad spot.

Video Cache is used by the Media Player to achieve seamless multiplexing and temporal ordering of multiple content videos and ad videos into a single video playout. The Unified Splicing Engine may provide (through DMA operations) origins with direct memory access to the Video Cache for direct delivery of the video chunks while the Unified Splicing Engine continues its orchestration (under control logic from the Ad Decision Engine and markup meta-data) of splicing origin video components available from the video cache into a unified video playout stream for the Media player unit. An important embodiment of Video Cache used in the present invention is a DVR Cache which uses a local storage on the DVR-enable consumer device to cache ad videos.

Multi-Service Data Collection Client is a client-side component of the data collection subsystem. It is responsible for receiving all relevant events from all client-side components participating in a data collection process, pre-aggregating said events according to its own configuration, and delivering resulting collected data to the Data Collection Service.

Markup Processor is a client-side component designated to manage and process ad spot metadata and request ad videos from an Ad Services System. Markup Processor is provided to monitor ad triggers associated with a content video which a consumer device is about to play or is playing. Markup Processor also collects and process enhanced ad spot attributes and primary ad spot attributes. Collectively the primary ad spot attributes and enhanced ad spot attributes form an enriched ad spot metadata. Further, Markup Processor supports plugin-based ad spot metadata enrichment and relies ad placement requests from Ad Decision Engine to an Ad Services System. The requests are enriched with ad spot metadata. This processor also receives replies from an Ad Services System and relays these replies to the Ad Decision Engine.

As to plugins of the Markup Processor, each consumer device has unique ID plugin. Depending on the consumer device this can be MAC address, IP address, serial number, UUID, and other values uniquely and permanently identifying a consumer device. The ID provided by this plugin can be an atomic value such set forth in the prior sentence or be a composite value consisting of multiple atomic values.

As to consumer device hardware characteristics plugin, this plugin provides hardware characteristics that can help an Ad Management System to better select ad videos for a consumer or the targeted group said consumer belongs to. Such hardware characteristics may include screen resolutions, available memory, CPU speed, size of the local storage on a consumer device, etc.

As to EPG programming metadata plugin, this plugin enriches the ad spot metadata with information about specific program being watched that given ad spot is associated with. The example of EPG programming metadata may include program title, program description, channel name, network name, program parental rating, program viewer rating, etc. The specific set of EPG programming metadata attributes is defined by the data available on a consumer device and as configured for this plugin.

As to ADM metadata plugin, this plugin enriches the ad spot with metadata retrieved from the third-party Ad Management System. The metadata format is an enumeration of one or more self-describing structures. In the event there are multiple ADM systems, a plugin will exist for each third-party ADM system. Other methods of ad metadata enrichment can be supported by adding more plugins to the Markup Processor. Markup Configuration consists of the list of allowed Origins. If this list is empty, then all Origins that a Consumer Device is capable of supporting are allowed and must be engaged. Otherwise, if this list is not empty, then only specified Origins are allowed and must be engaged. Markup Configuration also includes rules for producing generated ad spots. These rules are as provided by the Ad Service. As to states of plugins, also forming part of Markup Configuration, supported states include active, disabled, remove, update, and download (applicable to a newly available plugins).

Media Player is a component responsible for the seamless playout of all content videos and ad videos in the order specified by the Ad Decision Engine.

Plugins of the Media Player for video playback are as follows:
QAM video delivery;
Switched Digital Video (SDV) based QAM video delivery;
UDP-based video delivery;
Local Memory or Buffer;
HTTP Live Streaming (HLS);
MPEG-DASH;
Real-time Transport Protocol (RTP);
Real-time Streaming Protocol (RTSP).

It should be noted however, that other video playback protocols can be supported by adding corresponding plugin to the Media Player.

System Operation and Ad Delivery Use-Cases

The present invention allows for arbitrary matching of any content video delivery method with any method of ad video delivery. For example, inserting ad videos stored or cached in the consumer device local storage such as HDD/SSD into live content streams such as QAM Live TV is highly viable due to great reduction in the concurrent use of the shared bandwidth.

One of the essential aspects of the present invention relates to a capability to simultaneously provide multiple methods of ad video insertion within a unified system architecture. For example, inserting ad videos into live stream can be performed using multicast delivery for those consumer devices that do not have local storage and share the same network bandwidth used to deliver ad videos, e.g. non-DVR set-top boxes connected to the same physical network equipment. Simultaneously, devices with local storage may have ad videos inserted from local storage of the consumer device. In addition, devices receiving the same live stream via Internet, i.e. network not controlled by service provider, may have ad videos inserted from external CDN using unicast delivery. Finally, content delivered over IP may also be converted to QAM delivery for broadcast or multicast through available service provider network infrastructure.

The system invention implements the following use-cases in a fully unified method:
Ad insertion into live video stream. Ad videos are stored or cached in consumer device local storage.

Ad insertion into live video stream. Ad videos are delivered via multicast stream sessions. Consumer device selects which session to join based on directions received from Ad Services System.

Ad insertion into live video stream. Ad videos are delivered via unicast stream session. Each consumer device will receive a dedicated unicast stream with ad video.

Ad insertion into playback of the recorded video stored locally in consumer device, e.g. local DVR recording. Ad videos are stored or cached in consumer device local storage. Here, DVR video playback includes live video recorded in a temporary buffer with replay capability (live TV pause).

Ad insertion into playback of the Cloud DVR recording or Network DVR recording. Ad videos are stored or cached in consumer device local storage.

Ad insertion into playback of the Cloud DVR recording or Network DVR recording. Ad videos are delivered via unicast stream session from CDN.

Ad insertion into playback of the Cloud DVR recording or Network DVR recording. Ad videos are delivered via unicast stream session directly from Ad Services or Management System based.

Ad insertion into playback of the Live-to-VOD recordings. Ad videos are stored or cached in consumer device local storage.

Ad insertion into playback of the Live-to-VOD recordings. Ad videos are delivered via unicast stream session from CDN.

Ad insertion into playback of the VOD content video. Ad videos are stored or cached in consumer device local storage.

Ad insertion into playback of the VOD content video. Ad videos are delivered via unicast stream session from CDN.

Ad insertion into Live stream. Solution for QAM based set top boxes with no broadband connectivity The following sub-sections include, but are not limited to, use-case applications of the system solution.

In the following subsections, all requests, responses, and data are being transmitted through connected intermediate components illustrated in the associated architecture. For example, if Ad Decision Engine is requested to send a request to the third-party Ad Management System, the actual message is going through Unified Splice Engine, Markup Processor and Ad Service. Unless explicitly stated otherwise, the response travels in the reverse order.

Use-Case 1: Live-TV Ad Insertion with Ad Assets Stored or Cached on Consumer Device with Local Storage Such as Hard Drive (HDD)

This section discloses an example use-case application of the present invention for inserting ad videos into live TV streams watched simultaneously by large population of set-top boxes with a DVR local hard drive.

Hundreds of thousands and even millions of consumers are watching TV at the same time during peak hours. Ad placement opportunities announced approximately 15 seconds or less before ad block times on each channel (SCTE-35 trigger in MPEG-TS). Ad triggers may also be unreliable. Viewers on the same channel will have an ad spot at the same time. Ad blocks on different channels may be scheduled for the same moment in time. In this situation all viewers across all such channels have an ad spot displayed at the same time (and receive triggers at their STB 15 seconds or less ahead of ad spot). Currently available infrastructure is often incapable of supporting many individual targeted ad videos at the same time.

Figure 2:
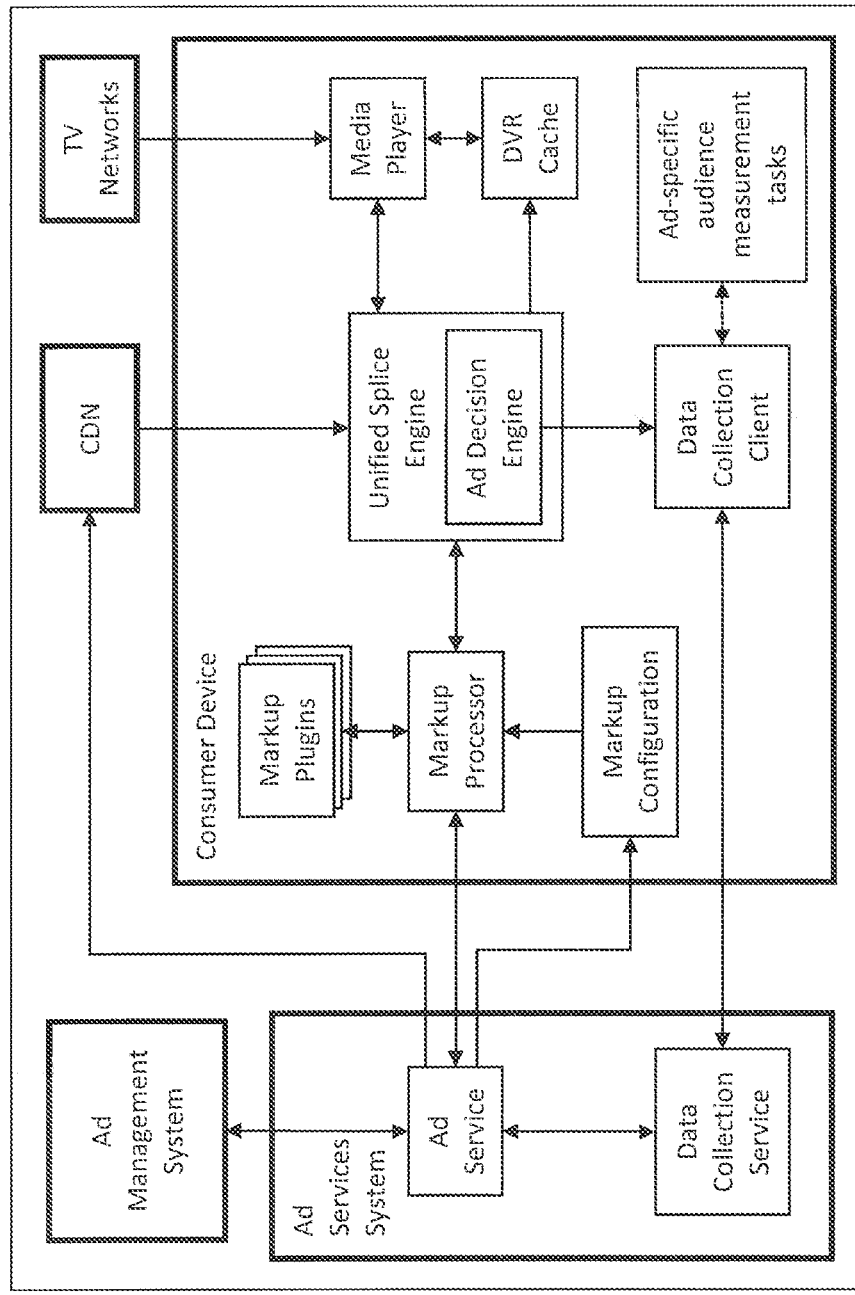
FIG. 2 is a diagram of Use-Case 1 System Architecture: Live-TV Ad insertion with Ad assets stored or cached on consumer device with local storage such as hard drive (HDD).

Reference is made now to FIG. 2 illustrating one embodiment of the system architecture with accompanying detailed explanation of each flow provided below in conjunction with the sequence diagrams. Ad Management System is provided with audience measurement data properly transformed to ensure sensitive data assets are controlled by the service provider from the entire STB footprint on an ongoing basis. Existing data collection mechanism is reused to collect required data such as what program on what channel and when it is being watched and on what set-top box.

Set-top boxes are allowed to request ad videos ahead of time based on a configurable period of time. In this respect, each set-top box can periodically (once in an hour, for example) request the list of the most anticipated ad videos from Ad Management System for the next 24 hours, or some other configurable frequency as determined by network conditions and available transports.

The Ad Service must monitor such requests, identify the same ad videos, and initiate caching of the most requested ad videos. The response from Ad Management System to the STB request for the list of ads allows the proxying Ad Service to identify the same ad assets scheduled for different set-top boxes. The response from Ad Management System also contains targeting information (see below).

The Ad Service commands DVR STBs to cache ad videos locally on a hard drive. Ad Services System may pre-cache videos on CDN for scheduled delivery to DVR STBs.

Ad Management System is notified of the upcoming ad spots from Zodiac Ad Services System. Based on the audience measurement data and current state of the ad campaigns, Ad Management System responds with identification of the ad videos to be played and targeting rules allowing STBs to use/apply these rules to the targeting information provided above and select appropriate ad video for insertion into the ad spot.

Ad Management System should introduce and poll ad inventory API call to respond with the list of the creative-ad inventory for pre-caching based on the campaign meta-data and EPG programming metadata passed in request. In order to reduce number of the VAST ad requests/responses, Ad Management System should introduce bulk request ad request for the entire STB range returning creative ad-id for each STB in the requested range. It is expected that ID's will be encoded in the most compacted form possible (for example using bit-masks). It is expected that bulk ad request call will offer the same ad avails previously provided by the ad inventory poll call. Bulk ad request call however will allow for 1:1 STB targeting and tracking even with the limited ad inventory available through pre-caching.

Ad Services System delivers targeting rules and multicast ad video playbacks (see below) based on optimal delivery schedule to the DVR STB population for local storage. DVR STBs play locally cached ad videos from the hard drive, if ad video is available.

Based on configurable rules and control of the Service provider, all STBs report ad impressions and associated user actions (e.g. tune away and trick modes) as enabled and required. Enhanced data collection mechanism is utilized that supports Service provider controls of data collection and distribution. Ad tracking reporting can be accomplished either by the STB devices using AMS as a proxy or by AMS backend performing tracking mapping on behalf of the STBs. In the latter case tracking requests are to be expanded by Ad Management System to include the encoded ad impression timestamp if necessary.

Audience Measurement Flow

Figure 3:
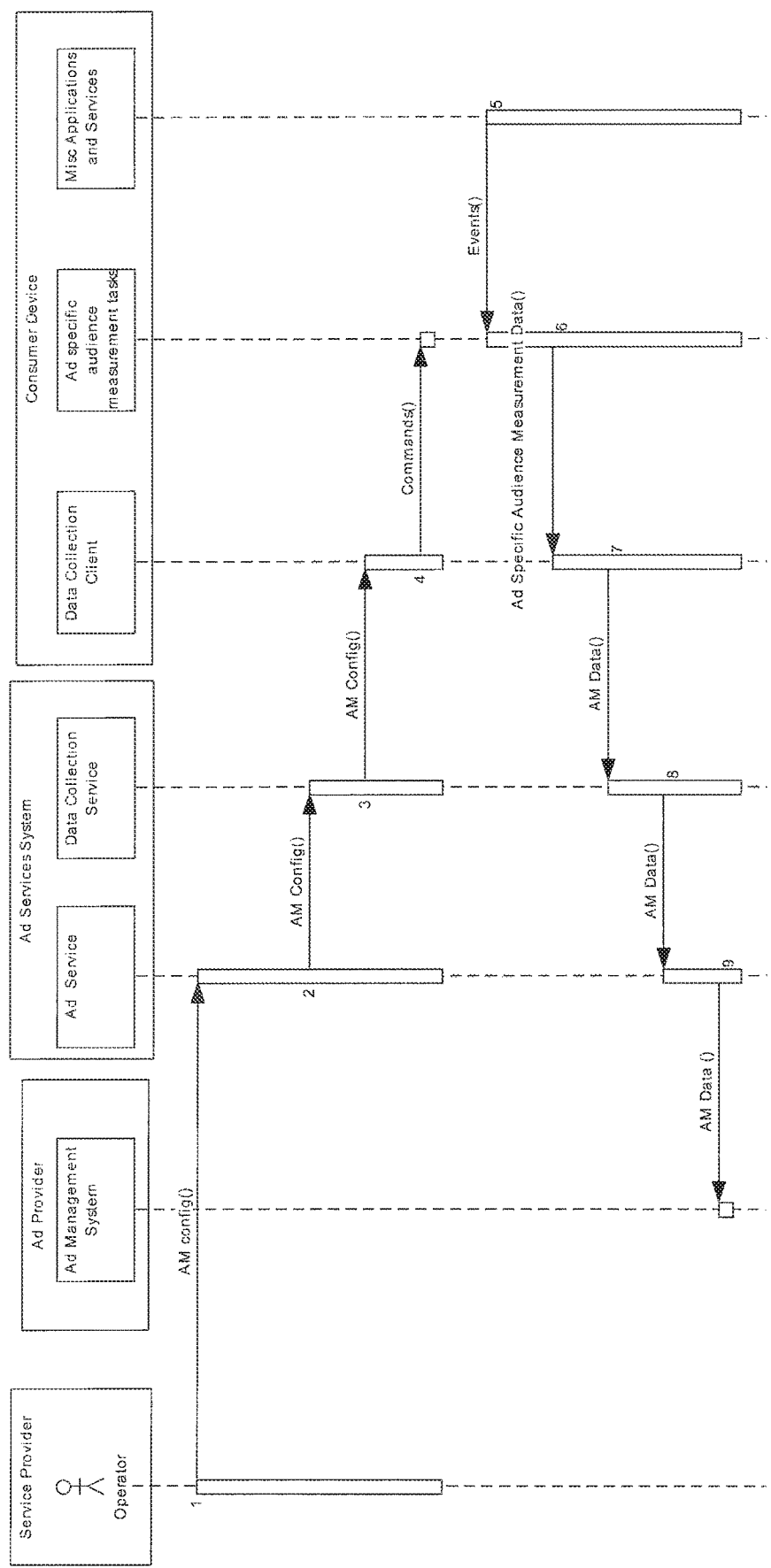
FIG. 3 is a diagram of Use-Case 1 illustrating Audience Measurement Sequence.

Reference is made to sequence diagram of FIG. 3, which represents the flow of events illustrating audience measurement flow configuration and data collection.

Service provider configures audience measurement via Ad Service Web UI to control privacy and data entity transformation rules enabling Service provider control of data delivery Ad Management System. Ad specific tasks (scripted plugins) of the Data Collection Client collect required audience measurement data and deliver to Ad Services System. Ad Management System utilizes this information along with other kinds of information received from service provider to build a profile for each set-top box.

Caching Flow

Figure 4A:
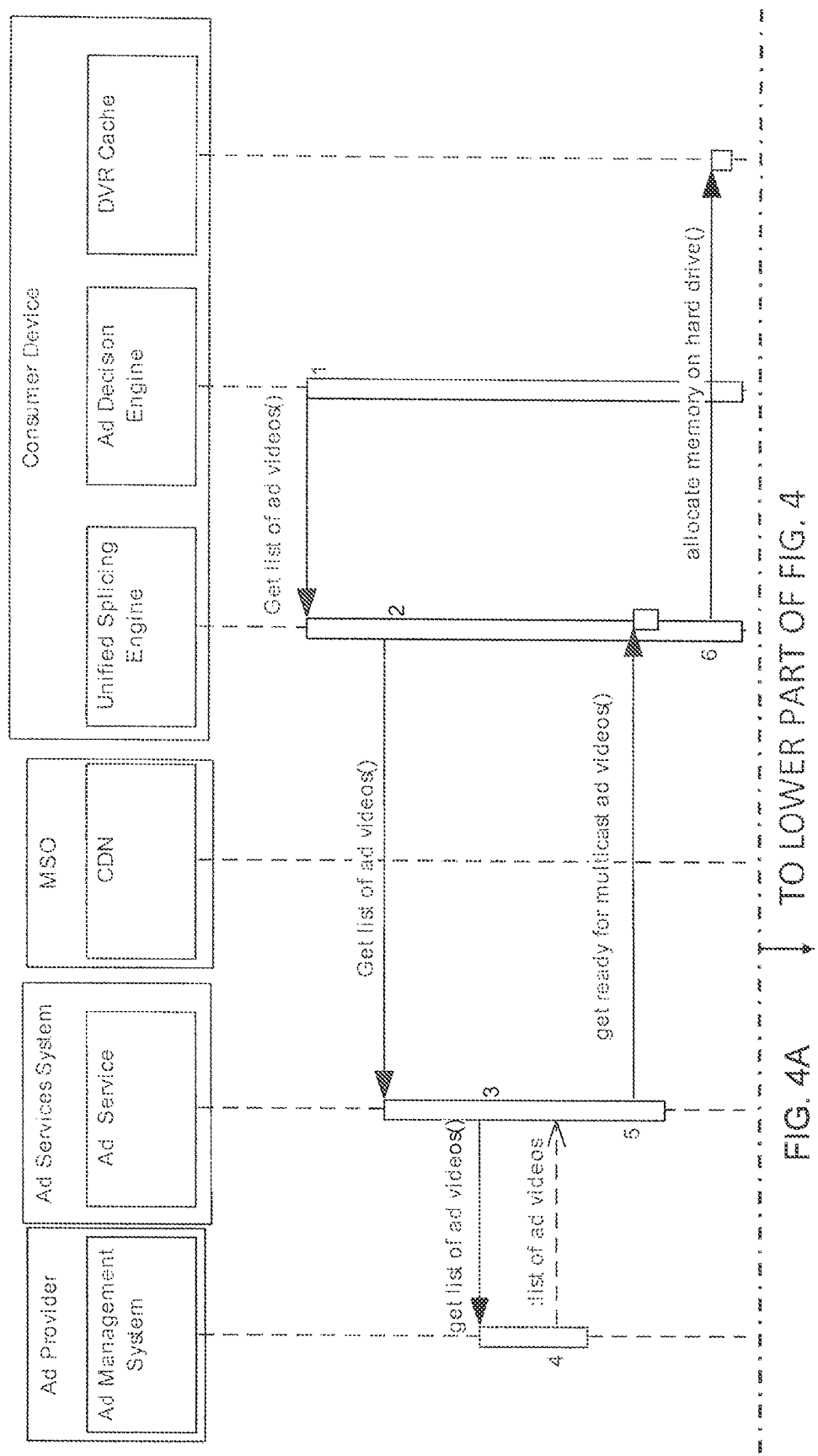

Reference is made to sequence diagram of FIG. 4, which represents flow of events related to the caching of the ad assets on the local PVR hard drive. The Ad Decision Engine on each set-top box in conjunction with the Ad Services System periodically requests Ad Management System to provide a list of ad videos that are mostly anticipated to be shown on this STB during the next configurable period of time, e.g. 24 hours. Multiple requests can be issued to Ad Management System for different EPG programming items.

Ad Management System responds with a list of ad videos to the Ad Services System. Ad Services System parses the response, collects the list of ad videos for the entire STB population and downloads ad videos from Ad Management System and stores them on CDN. Furthermore, Ad Services System prioritizes ad videos for caching on DVR boxes Ad Services System and provides DVR STBs with a list of ad assets that will be soon delivered through IP-multicast or IP-unicast (subject to network capabilities) for caching on the STB-local hard drive.

Unified Splicing Engine allocates resources for caching video assets that are delivered via one or more transports (IP-Multicast and/or IP-Unicast). Ad Service initiates multicast and/or unicast delivery of the ad videos to the DVR STBs and notify DVR STBs. Unified Splicing Engine downloads ad videos and caches them on the DVR hard drive. User's recordings are of the higher priority and as such may cause ad videos to be displaced and/or not stored on the hard drive. Fixed or dynamic allocation schemes or combination of both approaches are possible.

Impression Flow

Figure 5B:
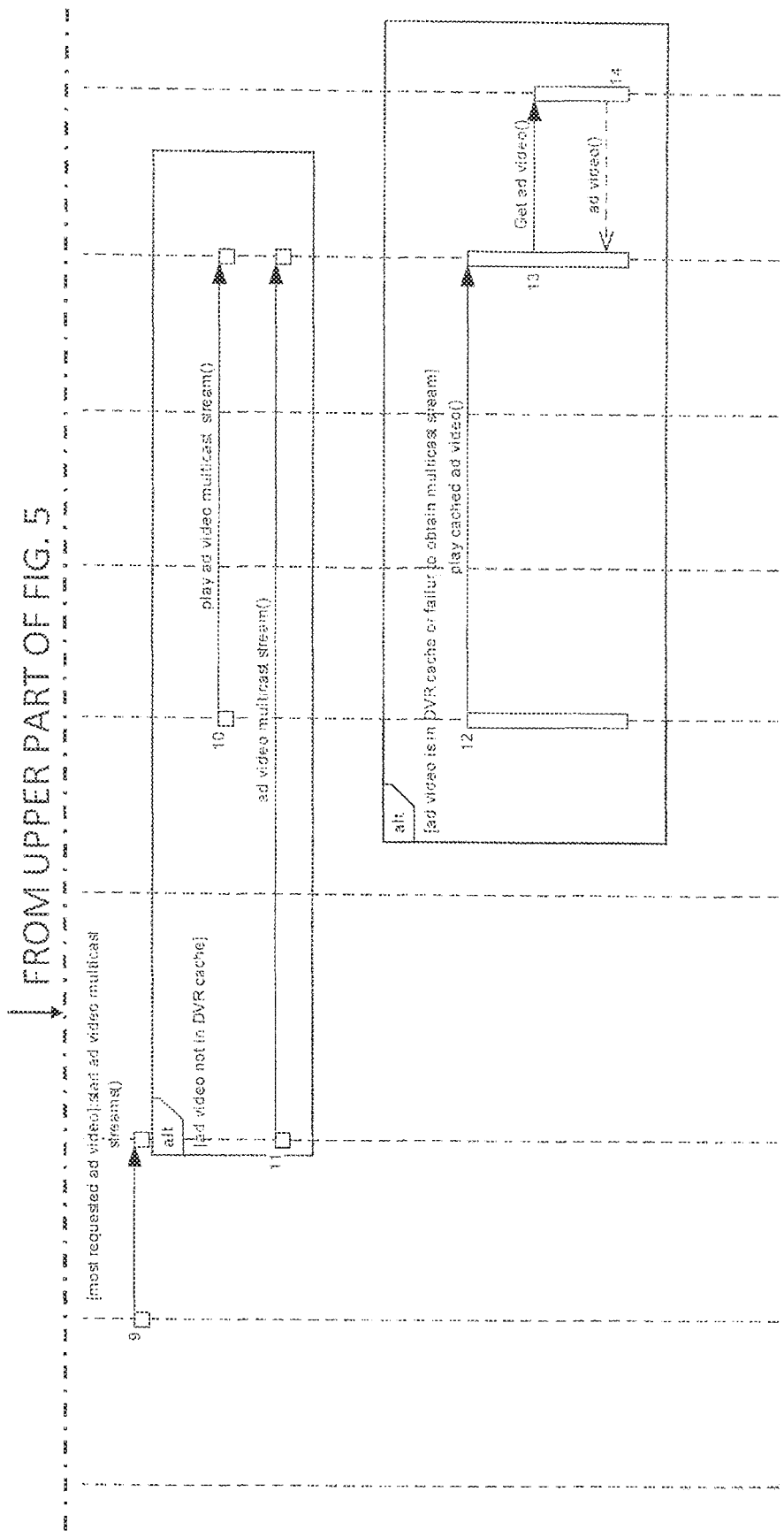

Reference is made now to FIG. 5, which is a diagram representing sequence of events illustrating Ad impression flow for the consumer devices with the local DVR cache. The diagram represents the flow initiated by ad spot trigger. Similar flow may also occur on the scheduled content-boundary for a given channel.

The Unified Splicing Engine receives an original trigger from channel's MPEG-TS as it was inserted by TV network. The Unified Splicing Engine uses a probability configuration as provided by Ad Services System (see below) to decide whether trigger will be relayed to Ad Service. The probability configuration contains probabilities for each live channel for a trigger to be relayed to Ad Services System. If trigger is conditionally delivered to the Ad Services System, the Unified Splicing Engine commands the Markup Processor to enhance the trigger with data required for Ad Management System to respond to the ad spot opportunity and for Ad Services System to calculate the probabilities (see below) using Markup Plugins.

Markup Processor relays enhanced trigger to the Ad Services System. Based on the audience measurement and information contained in the enhanced trigger, the Ad Services System constructs a probability configuration for the STBs to rely future ad spot triggers back to the Ad Services System. The more consumers are expected to watch a channel, the less probability of relaying a trigger will be calculated by the Ad Services System for that channel. Only one trigger per ad spot is processed by the Ad Services System and the rest are ignored; the probability configuration is required to minimize the number of the duplicate triggers relayed by STB population to the Ad Service The Ad Services System periodically delivers update probability configuration to STBs. The exact period of updates and method of delivery is decided by Ad Services System on as needed basis. The Ad Services System sends one or more requests that represent a batch or set of STB ad requests to Ad Management System with ad spot information (from the enhanced trigger)

Ad Management System replies with the following information. What ad videos are required to be delivered for a given ad spot on a given channel (pre-caching). What ad videos the DVR STBs are required to play. What are the fallback ad videos in case the required ad videos are not cached on either CDN or DVR STB's hard drive.

The Ad Services System responds to the Unified Splicing Engine by inserting ad-specific triggers into MPEG-TS or through multicast/unicast delivery transports). Insertion of the ad-specific trigger can happen either as reaction to the cue-tone (real-time) or periodically (carousel). Changes in ad-specific triggers are expected predominantly on content boundaries. The Ad Services System initiates multicast ad video delivery and/or directed unicast ad video scheduled and delivered based on targeting criteria and dynamic network utilization state.

The Unified Splicing Engine on DVR STB checks if required ad video is cached on the hard drive. If video is cached, then Unified Splicing Engine commands a Media Player to play that ad video replacing the live TV stream. If video is not cached or STB failed to acquire multicast stream, the Unified Splicing Engine commands the Media Player to play preferred ad video available from the ad video multicast.

Reporting Flow

Figure 6:
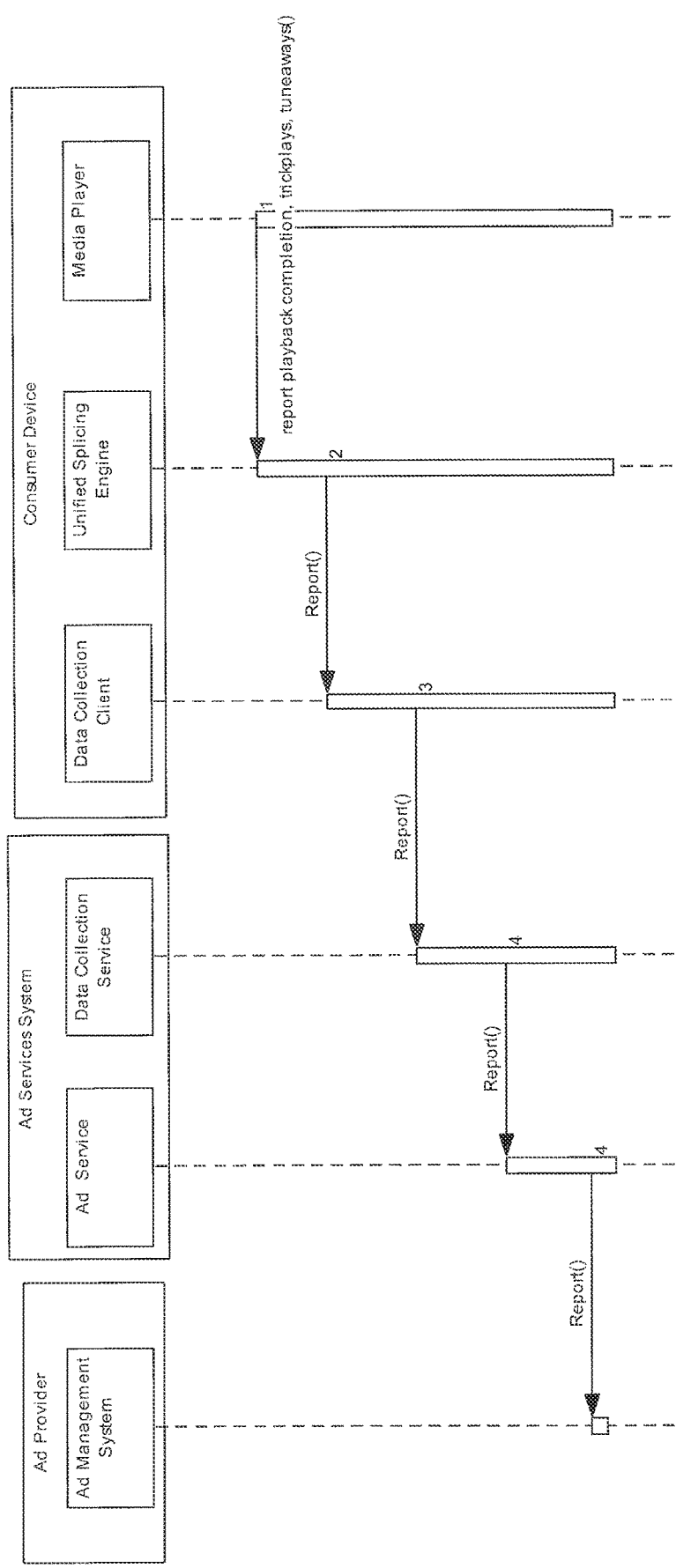
FIG. 6 is a diagram of Use-Case 1 illustrating Reporting Sequence.

Reference is made now to FIG. 6, which is a sequence diagram reporting flow. Upon completion of the ad video playback the Media Player reports to the Unified Splicing Engine. The Media Player also reports all attempts to skip the ad video and tunes to another channel. It should be noted that the tune to another channel cannot be blocked by non-skippable interval of the ad video. The Unified Splicing Engine generates appropriate data collection events and delivers them to the Ad Services System via data collection mechanism which further processes the data according to Service provider requirements prior to third-party delivery. The Ad Services System reports collected data to Ad Management System.

Use-Case 2: Live-TV Ad Insertion with IP Delivered Ad Assets

This section discloses an example use-case application of the present invention for for inserting ad videos into live TV streams watched simultaneously by large population of consumer devices without a local storage capable of caching meaningful number of ad videos.

It is well known that hundreds of thousands and even millions of consumers are watching TV at the same time during peak hours or highly popular shows such as sports, etc. Consumer devices without meaningful amount of local storage have no capacity for pre-caching necessary variety of ad assets locally. Ad placement opportunities in live recordings announced only few seconds before an ad spot on each channel (SCTE-35 trigger in MPEG-TS). Ad triggers may also be unreliable. Drawbacks of currently available infrastructures regarding support of multiple individual targeted ad videos at the same time are known. All viewers on the same channel will have an ad spot at the same time. Ad blocks on different channels may be scheduled for the same moment in time. Viewers across all such channels have an ad spot displayed at the same time (and receive triggers at their Consumer Devices few seconds ahead of an ad spot).

Figure 7:
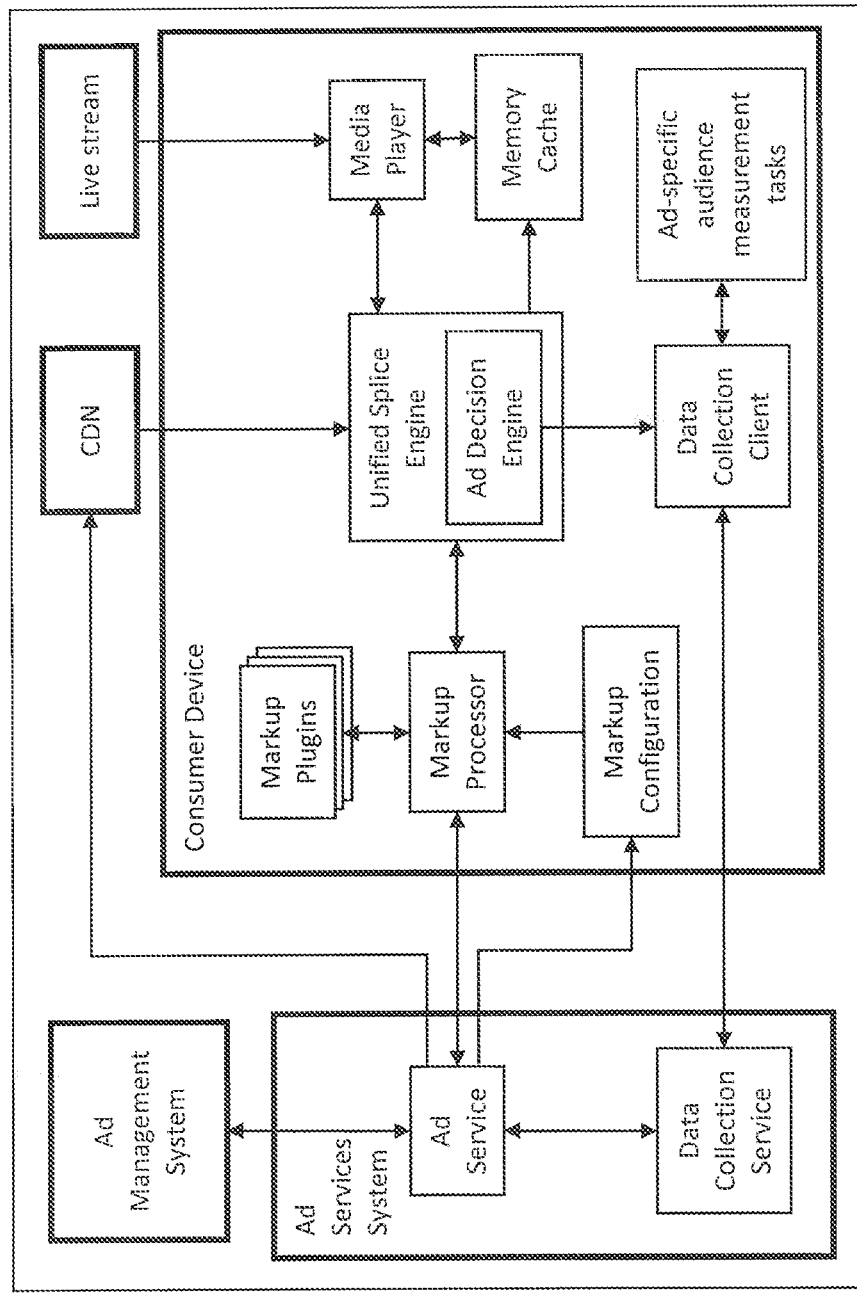
FIG. 7 is a diagram of Use-case 2 System Architecture: Live-TV Ad insertion with IP delivered Ad assets.

Reference is made now to a diagram of FIG. 7, which is a system architecture diagram showing Live-TV Ad insertion with IP delivered Ad assets provided to address the above-discussed prior art drawbacks. Ad Campaign Management System is provided with audience measurement data properly transformed to ensure sensitive data assets are controlled by the service provider from the entire Consumer Devices footprint on an ongoing basis. Existing data collection mechanism is reused to collect required data such as what program on what channel and when is being watched and on what consumer device.

Consumer devices are allowed to request ad videos ahead of time based on configurable period-of-time or based on a real-time event. In this respect, each consumer device can periodically (once in an hour, for example) request the list of the most anticipated ad videos from Ad Provider for the next 24 hours or some other configurable frequency, as determined by the network conditions, available transports, and other applicable factors. Additionally, a consumer device may make a real-time request based on a configurable and dynamic real-time event such as a channel tune or ad trigger marker received.

The Ad Service must monitor such requests, identify the same ad videos requested from different consumer devices, and initiate caching of the most requested ad videos. Furthermore, Ad Service initiates caching of all ad assets on CDN for scheduled delivery to Consumer Device. The response from Ad Provider to the Consumer Device request for the list of ads must allow the Ad Service to identify the same ad assets scheduled for different consumer devices. The response from Ad Provider must also contain targeting information (see below).

Provisioning for the low latency ad delivery—caching and multicast transports are utilized by Ad Service in the following manner. For the most popular ad assets associated with the maximum concurrency programming, Ad Service initiates placement of the ad assets onto multicast transport. Multi-cast start is initiated in real time upon arrival of the ad trigger.

An Example criteria for provisioning of the ad asset is a combination of following factors: number of responses for the Consumer devices which schedule the referenced asset; audience measurement popularity weight for the given programming; and time of the day matched to the programming targeting metadata. It should be noted that other criteria can be also considered if needed.

This method of caching ad videos using multicast delivery forms level 1 low latency ad video cache for the most popular live streams where ad insertion is performed. Ad Decision Engine is allowed to request ad videos from the Ad Service upon miscellaneous events including, but not limited to: (a) boundaries of the individual programs delivered in a live stream, (b) configurable time intervals, (c) watching a live stream for configured minimum time, (d) programmatically utilizing dynamic markup trigger event. Ad Service consults Ad Management System as necessary and commands Consumer Devices to cache ad videos. Ad Decision services verifies if scheduled ad assets are available on the multicast level I cache and, if not, attempts to cache them locally in RAM of the consumer device. This method of caching is considered level 2 cache. Due to the limited availability of the caching space in RAM, a Consumer Device only attempts to cache the ad videos scheduled for insertion into the most anticipated programming for this consumer device or household it belongs to.

Example criteria for selecting an ad video for caching is a combination of the following factors: ad videos scheduled for insertion into the currently watched live stream; consumer device level or household level audience measurement data for the current device (history of content consumption) and time of the day. Other criteria can be also considered if needed If ad video that needs to be inserted is missing from both level 1 and level 2 caches, a unicast delivery of the ad video over available transport is attempted in real time. If network conditions do not allow for successful ad impression, the system will register ad opportunity miss, will not perform ad video insertion, and will continue uninterrupted showing of the original live stream video. Rest of the messaging flows and data processing is the same as Live TV with DVR-based Caching use case (please refer to the corresponding previous section).

Caching Flow for Devices with in RAM Buffer Only

Figure 8:
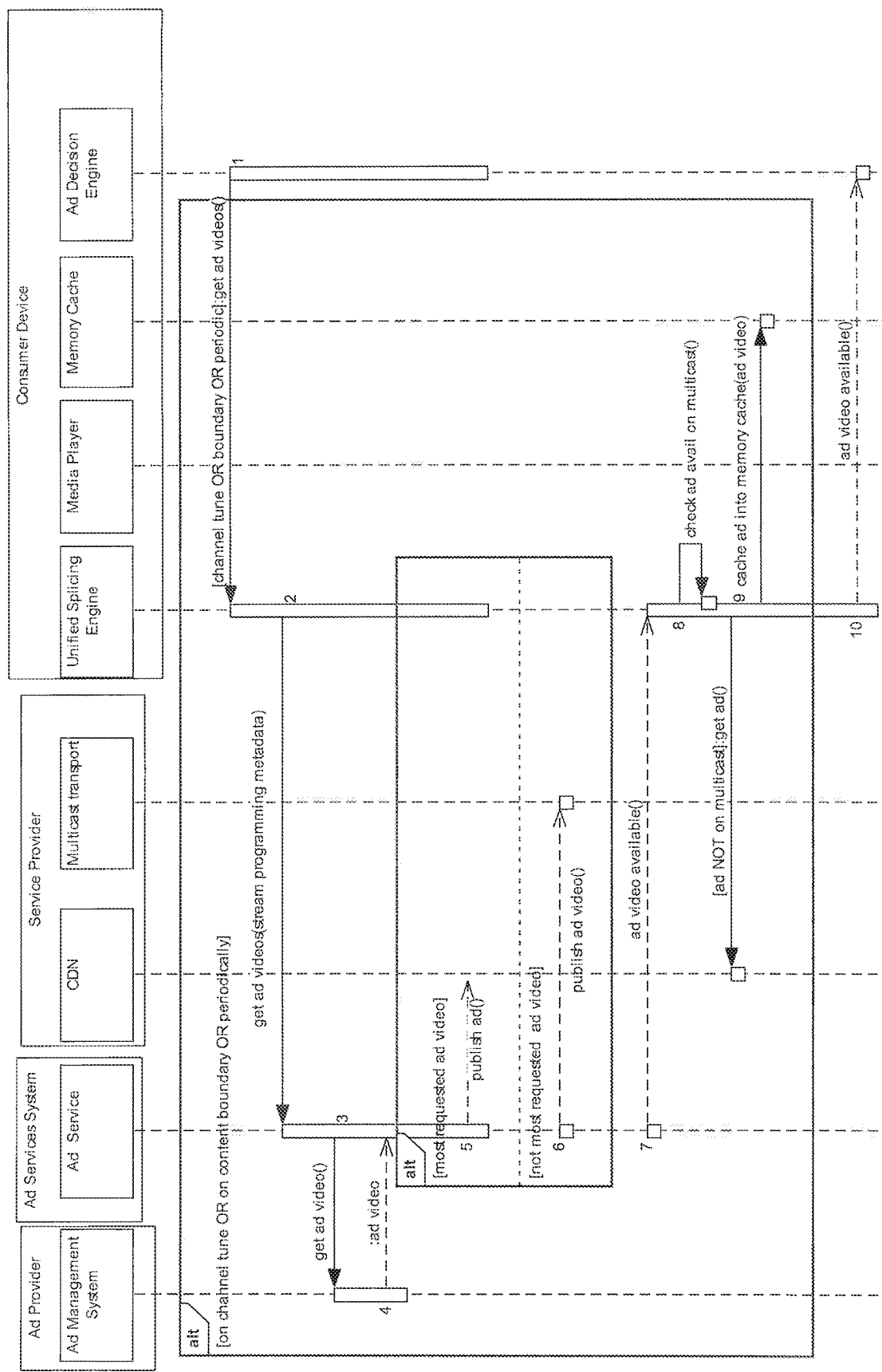
FIG. 8 is a diagram of Use-Case 2: Live-TV Ad insertion with IP delivered Ad assets (RAM caching).

Reference is made now to the diagram of FIG. 8 which illustrates RAM caching aspects of Use-Case 2. More specifically FIG. 8 illustrates a process of priming ad in RAM cache for the consumer devices without local storage.

Regarding caching flow for devices with in RAM buffer only, most requested ad videos for the most popular live streams are made available by the system using multicast delivery. The Ad services system may intelligently schedule delivery of ad content according one or more configurable rules based on patterns of traffic and/or usage. A second method is for Consumer devices issue periodic requests on miscellaneous events such as EPG data program boundaries, channel changes, watching a live stream for the configurable time intervals, etc. to cache the expected ad videos for the most anticipated live streams in the RAM buffer. Ads are only cached locally in RAM, if they are not available on the multicast transport. If required ad video is not present in cache, the given ad video is requested in real time at best effort service level. Request logic can be further optimized based on scheduling meta-data delivered to the consumer devices and processed by the present invention for optimal operation.

Impression Flow

Figure 9B:
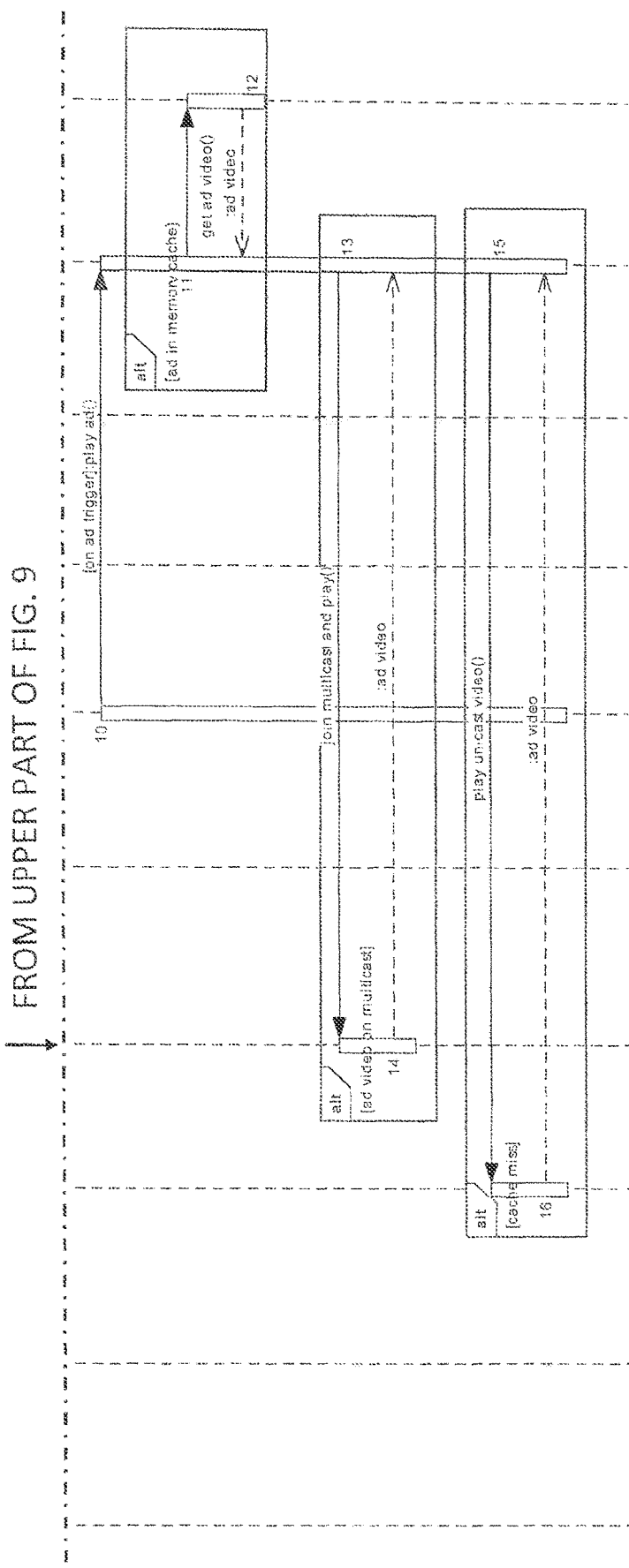

Referring now to FIG. 9, which is a diagram illustrating flow of events associated with delivering ad impression to the consumer device with no local storage. FIG. 9 also represents the flow initiated by ad spot trigger. Similar flow occurs upon the scheduled boundary of the programs in the live stream.

The Unified Splicing Engine receives an original ad spot trigger from live stream as it was inserted by live stream origin. The Unified Splicing Engine uses a probability configuration as provided by Ad Services System (see below) to decide whether trigger will be relayed to Ad Service. The probability configuration contains probabilities for each live stream for a trigger to be relayed to Ad Services System. If trigger is conditionally delivered to the Ad Services System, the Unified Splicing Engine commands, prior to delivery, the Markup Processor to enhance the trigger with data required for an Ad Management System to respond to the ad spot opportunity and for Ad Services System to calculate the probabilities (see below) using Markup Plugins. Markup Processor relays enhanced trigger to the Ad Services System.

Based on the audience measurement and information contained in the enhanced trigger, the Ad Services System constructs a probability configuration for the STBs to rely future ad spot triggers back to the Ad Services System. The more consumers are expected to watch a live stream, the less probability of relying a trigger will be calculated by the Ad Services System for that channel. Only one trigger report per ad spot is processed by the Ad Services System and the rest are ignored; the probability configuration is required to minimized the number of the duplicate triggers relayed by STB population to the Ad Service. The Ad Services System sends one or more requests that corresponds to a set of consumer devices' ad requests to Ad Management System with ad spot information.

Ad Management System replies with the following information: what ad videos are required to be delivered for a given ad spot on a given live stream; what ad videos the consumer devices are required to play; and what are the fallback ad videos in case the required ad videos are missing from both level 1 and level 2 caches.

The Ad Services System responds to the Unified Splicing Engine by inserting ad-specific triggers into the live stream or through multicast/unicast delivery transports. Insertion of the ad-specific trigger can happen either as reaction to the original trigger in the live stream or periodically based on scheduled time intervals. The Ad Services System initiates multicast ad video delivery and/or directed unicast delivery of an ad video based on targeting criteria and dynamic network utilization state.

The Unified Splicing Engine on the Consumer Device checks if required ad video is available on the multicast transport or cached in memory. If ad video is cached in memory (level 2 cache), then Unified Splicing Engine commands a Media Player to play that ad video replacing the live stream. If ad video is available on the multicast transport (level 1 cache), the Unified Splicing Engine commands the Media Player to play that ad video replacing the live stream. If ad video is missing from both level 1 and level 2 caches, then best effort attempt to retrieve ad video over unicast delivery is performed. Reporting flow in this application is the same as in the use case of Live Video with local DVR cache use case. Thus, the description of flow reporting is not provided.

Use-Case 3: Ad Insertion into DVR and Live-to-VOD Playout

This section discloses an example use-case application of the present invention for for inserting ad videos into recorded Live TV programming which are stored in the service provider provided systems such as Cloud DVR (same as Network DVR) or Live-to-VOD (also known as Catch Up TV). Only Live-to-VOD aspect of the Video-On-Demand (VOD) video delivery is covered in this section. Both Cloud DVR and Live-to-VOD playouts are nearly identical from perspective of the present invention.

Pre-caching of the matching ad videos for each recorded program is not feasible due to the high storage overhead requirements. Due to this fact, the ad video delivery method is unicast. Pre-roll ad insertion presents the biggest challenge because there is a limited lead time available to pre-buffer ad content delivered via unicast. Insertion of ad videos into playout of the VOD and Cloud DVR content has been traditionally performed as network-based ad insertion through SCTE-130 based advertisement campaign management systems tightly coupled with the corresponding VOD or Cloud DVR back-office through vendor specific Ad Decision Management (ADM) component. ADM components are tightly coupled with the specific back-office. In view of the above, universal solution is challenging.

Ad spot triggers in the recorded live programming may be located too close to the actual ad spot, which will not allow for real time ad request and response during playout of the recorded program. VOD client and Cloud DVR client on a consumer device may not allow access to the SCTE-35 triggers in MPEG stream during or post recording process. Issue of the poor timing of the ad spot trigger for the recorded live programming cannot be address on the consumer device side, as recorded programming is not directly accessible by the consumer device (access is only possible through cloud DVR and VOD client and via cloud DVR and VOD back-office).

Figure 10:
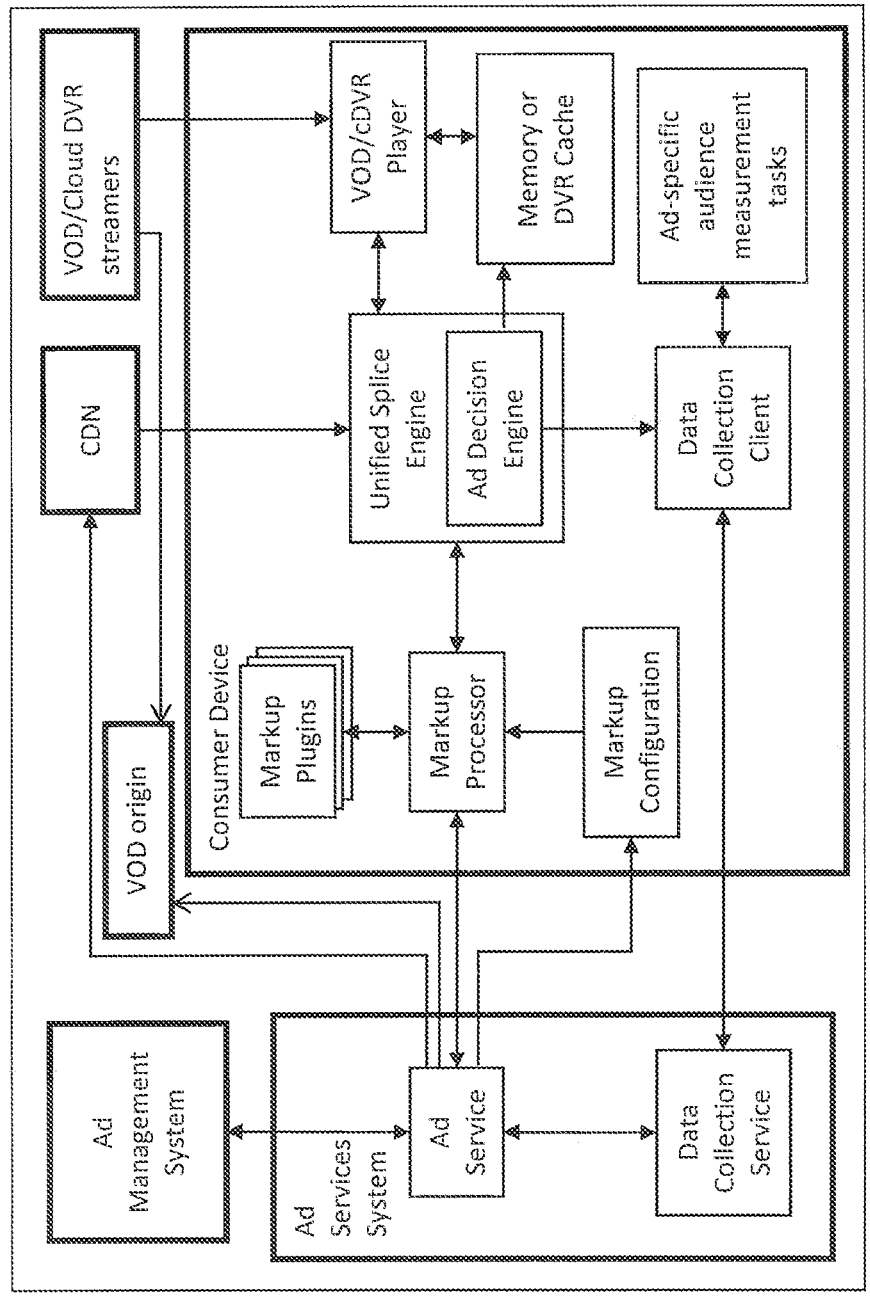
FIG. 10 is a diagram of Use-Case 3 System Architecture: Ad insertion into DVR and Live-to-VOD playout.

Reference is made now to the diagram of FIG. 10 which is the system architecture diagram of Use-Case 3 disclosing Ad insertion into DVR and Live-to-VOD playout, and also illustrating structural components providing ad splicing for Live-To-VOD or Cloud DRV sessions. Cloud DVR, from the perspective of the ad video insertion, is a subset of the overall VOD scenario. Full VOD use case however is wider and constitutes recordings of the programming previously aired on Live TV as well as premium featured content (movies). Handling of the ad spot information and the insertion of the ad videos into premium VOD playout are covered in other sections of the document.

The following section provides high level overview of the solution. Detailed explanation of each flow is provided below. Cloud DVR platforms in North America mandate creation of the unique copy of the programming per consumer account, therefore offline collection (after recording of the program completes) of ad spot triggers may present very high overhead. If this is the case, then offline collection is only used for Live-to-VOD use case.

This embodiment of the invention provides the following methods of ad spots set creation. (1) System provides offline ad spot scanner utility which integrates into normal VOD ingest workflow, cloud DVR ingest workflow. Collected ad spot set information is ingested into Ad Service. Offline ingest of the ad spot information allows for pre-caching of ad assets. (2) For cloud DVR use-case if offline collection of ad spot triggers is not available, such triggers will be processed in real time. (3) For the recorded programs that do not have ad spot triggers, a method of automatic rules-based generation of ad spots is provided.

If local storage is available on the Consumer Device and offline ad spot trigger information is collected, ad video pre-caching will be performed the same way as described in the Local DVR playout use-case. It should be noted that VOD/CoudDVR Player (Video-On-Demand Player, Cloud DVR Player) is used in place of more generic Media Player.

Offline Acquisition of the SCTE-35 Ad Spot Triggers

Figure 11:
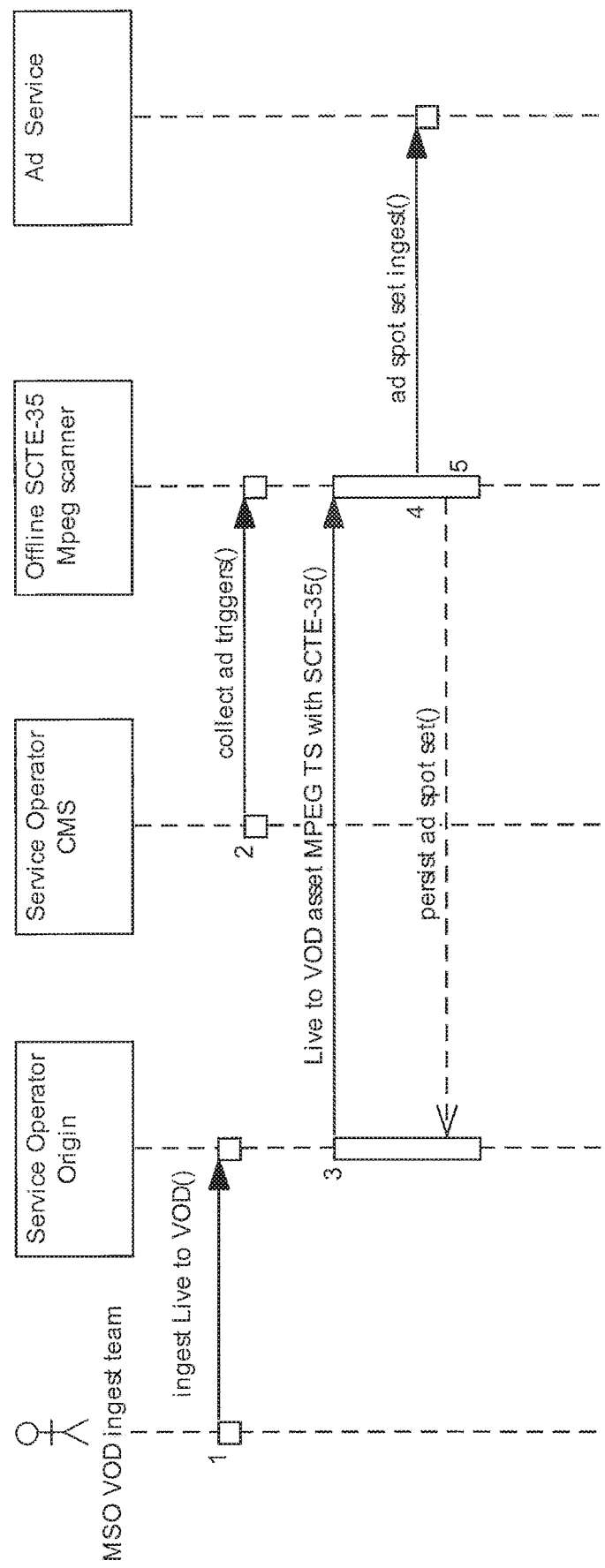

Reference is made now to FIG. 11, illustrating sequence of events representing offline SCTE-35 triggers collection. For the Live-to-VOD and shared copy Cloud DVR scenario, the offline collection of the ad spot set is performed as described below. As an example of the ad spot trigger, the SCTE-35 trigger is used. For the unique copy cloud DVR scenario such collection will create high overhead, therefore pre-caching of ad assets will not be performed, and ads will be accessed in real time on incoming ad spot trigger during playout.

Caching Flow for when Offline Ad Spot Information is Available

Figure 12:
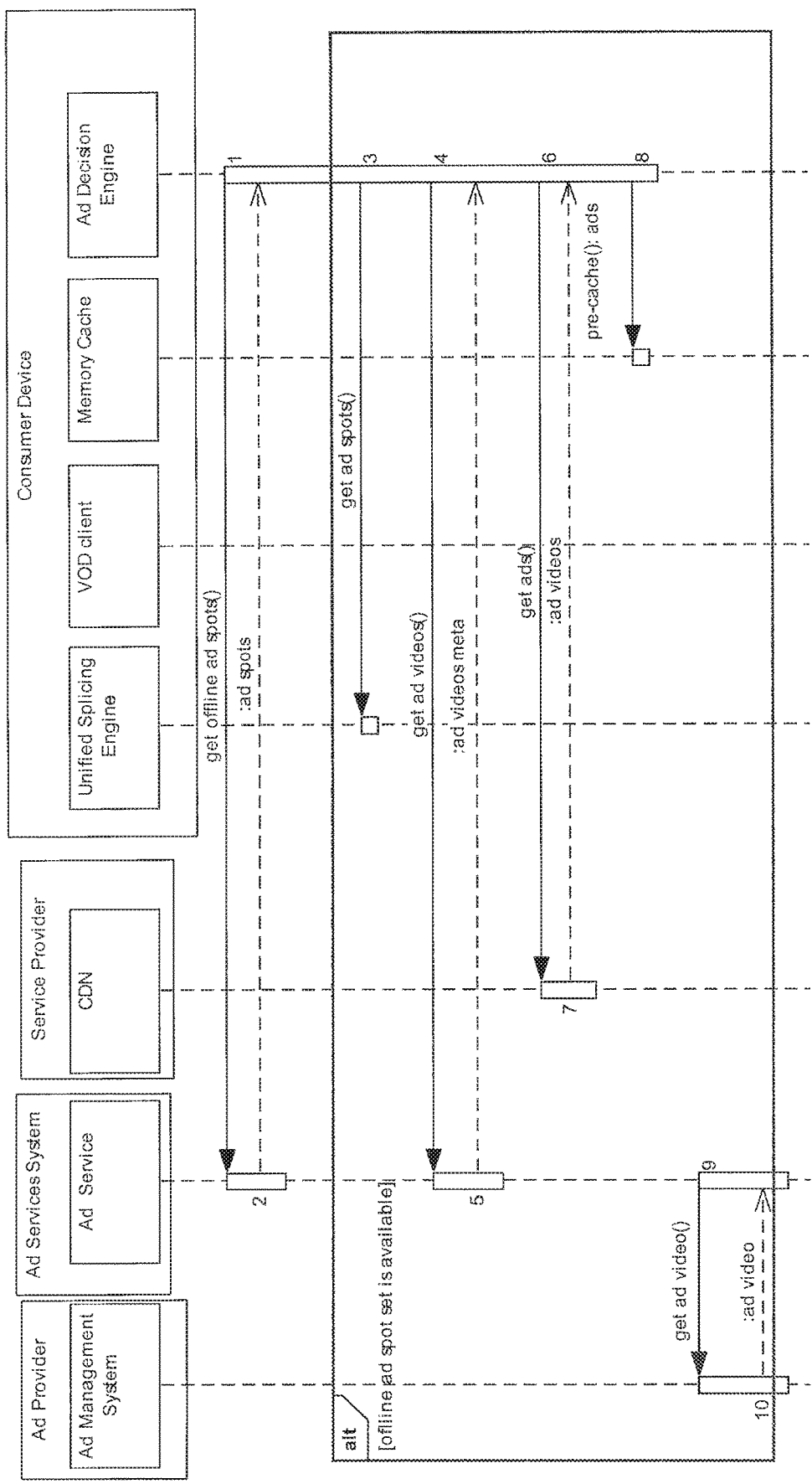
FIG. 12 is a diagram of Use-Case 3: Ad insertion into DVR and Live-to-VOD playout (Pre-caching and buffering).

Reference is made now to the diagram of FIG. 12, which illustrates pre-caching and buffering method for Live-to-VOD and Cloud DVR ad insertion use case. Pre-caching of the most anticipated ad videos on the local CDN is described in the Ads for Live TV with DVR-based Caching use-case and is not repeated here. Caching flow is only applicable when offline ad spot information is collected. Caching mechanism is similar to the caching implementation for Consumer Devices with local storage. If ad video is not cached, such ad video is requested in real time on ad spot trigger arrival at best effort service level.

Impression flow in this application is similar to that of Local DVR Playout use case and such description is not repeated here. For the description of the respective impression flow refer to the corresponding section of the application. Reporting flow is similar to that of Live Video with local DVR cache use case and such description is not repeated here. For the description of the respective reporting flow refer to the corresponding section of the application.

Use-Case 4: Ad Insertion into Playout of Locally Stored DVR Recordings

This section discloses an example use-case application of the present invention for inserting ad videos during playout of the recorded programs that are stored in the DVR storage of the consumer device. Model of operation is unicast and is statistically randomized. Pre-caching of the matching ad assets for each record created on the local hard drive is not feasible due to the high storage overhead requirements. Pre-roll ad insertion presents the biggest challenge because there is a limited lead time available to pre-buffer ad content delivered via unicast from CDN. Ad triggers in the recorder programming may be located too close to the actual ad spot, which will not allow for real time ad request and response during playout of the recorded program. DVR client on a consumer device may not allow access to the SCTE-35 triggers in MPEG stream during or post recording process.

Figure 13:
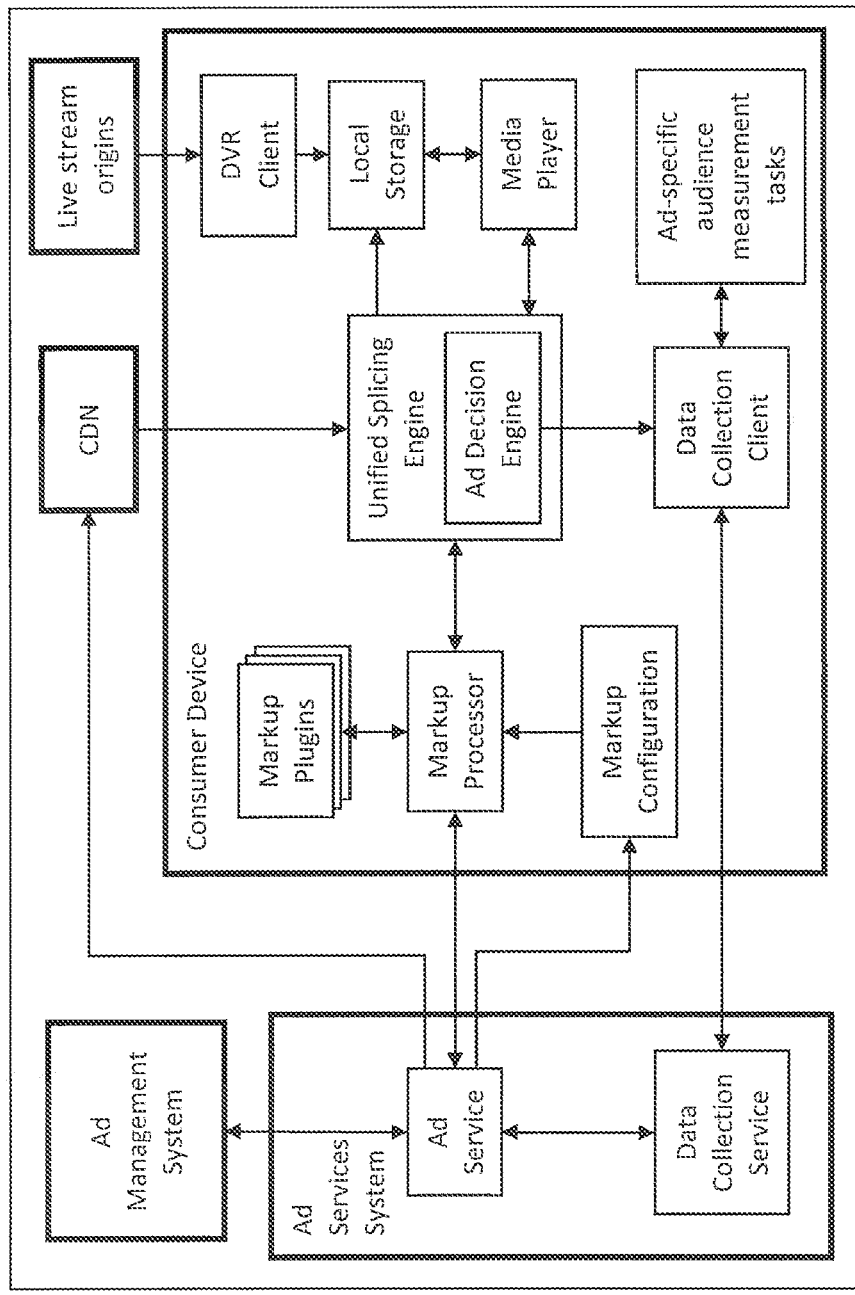
FIG. 13 is a diagram of Use-Case 4: Ad insertion into playout of locally stored DVR recordings.

Reference is made now to the architecture diagram of FIG. 13, which illustrates flows of an embodiment of the invention provided to resolve the above-noted drawbacks of the prior art. To address the issue of the poor timing of the ad triggers (poor timing), acquisition of the ad spot trigger while recording is recommended. During recording, a set of SCTE-35 ad spot triggers arriving in the MPEG stream should be captured and persisted on the DVR local storage alongside with a recorded program. Availability of extracted ad spot triggers also allows for pre-caching of ads during recording playout.

This embodiment of the invention provides the following methods of ad spots set creation: (1) For the DVR-enabled consumer devices where DVR client allows access to SCTE-35 triggers, said triggers will be captured during recording process. (2) For the DVR-enabled consumer devices where DVR client does not provide access to SCTE-35 triggers, a scan of the recorded programs for detection of the triggers is provided. (3) For the recorded programs that do not have SCTE-35 triggers, a method of automatic rules-based generation of ad spots is provided.

Captured triggers are persisted on the local DVR storage to form the set of ad spots matching each recording. Set of ad spots is enriched with the targeting information related to the programming metadata and customer profile.

For faster pre-roll playout, the Ad Decision Engine may attempt to pre-cache the ad videos in the following priority: Availability of the next episode of the existing series recordings; New recording availability; Recording viewership stats.

Ad Targeting for pre-caching is based on the user profile and programming metadata. Universal Splicing Engine (USE) component (see below) implements cache selection and cache routing to facilitate faster pre-roll playout of the ad videos. On playout of the locally stored recorded program, the Ad Decision Engine looks up a set of ad spots persisted by DVR client during recording and issue corresponding ad request to the Ad Management System. Pre-roll ad is played from the cache or fetched directly from CDN. Mid- and post-rolls ad videos for the existing ad spots set are retrieved from CDN via unicast transport and cached on the local storage during recording playout and ahead of the actual ad spot. Rest of the messaging flows and data processing is the same as for Live TV with DVR-based Caching use case (please refer to the corresponding section).

Flow: Acquisition of the Ad Spots

Figure 14B:
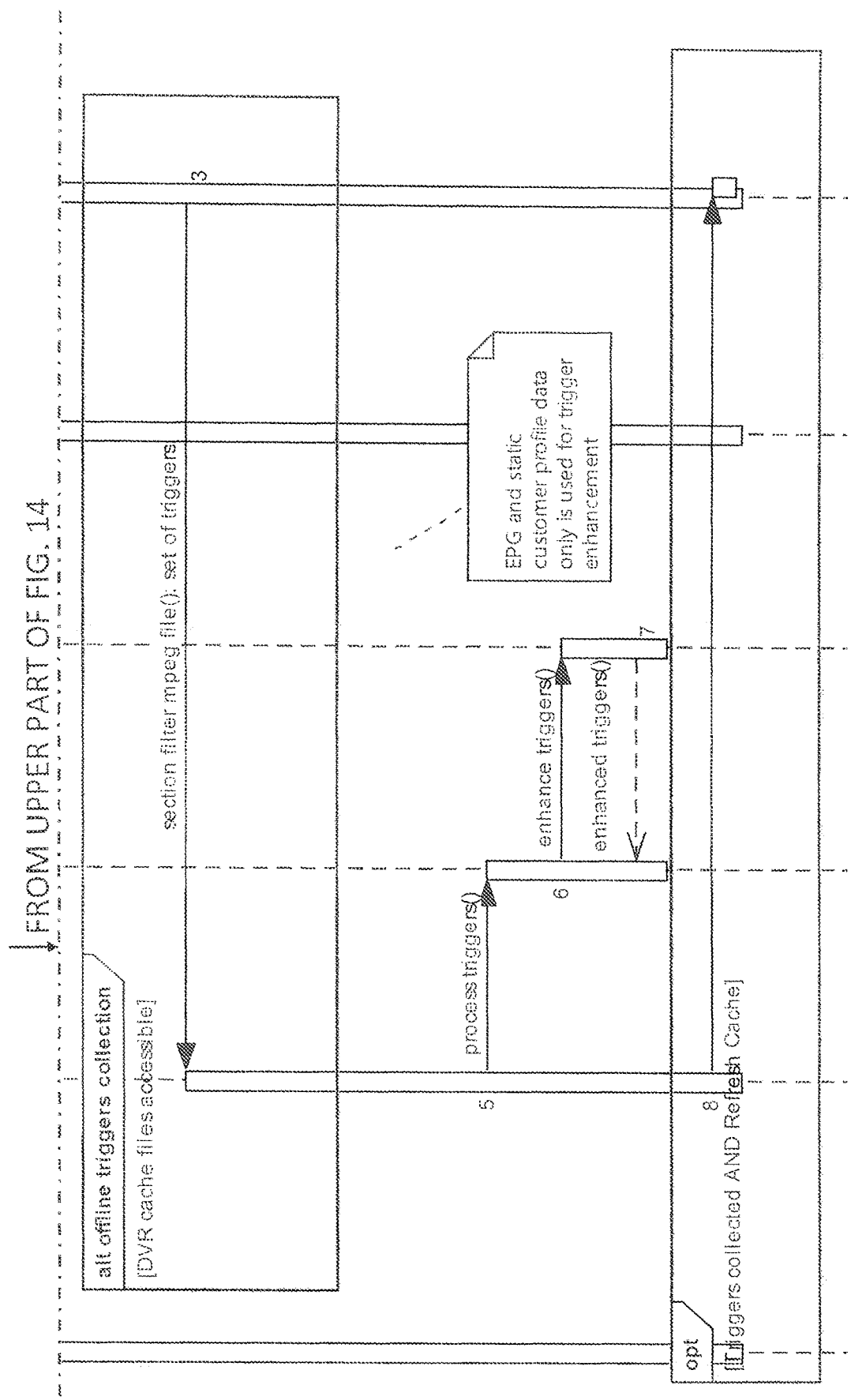

Reference is made now to FIG. 14, which is a diagram of Use-Case 4 illustrating acquisition of the Ad Spots aspect of Ad insertion into playout of locally stored DVR recordings. FIG. 14 also illustrates the process of trigger acquisition discussed below. Live stream origins, such as TV Networks, provide video feed with embedded SCTE-35 ad spot triggers which is being recorded by the DVR client and persisted on the DVR cache. If accessible, DVR client analyzes incoming video feed and retrieves SCTE-35 ad spot triggers from the data PID of the MPEG transport stream. If DVR client does not retrieve SCTE-35 triggers, the DVR recordings are accessed as files post recording by USE to perform scan the newly completed recording for ad spot triggers. If set of triggers is collected it is being processed and decorated by Markup Processor and Markup plugins. Static information such as EPG metadata and customer profile data can be used for decoration. If triggers are not present in the recorded program or cannot be retrieved, then triggers are artificially generated based on the ad spot generation rules provided by the Ad Service.

Flow: Local DVR Pre-Caching

Figure 15B:
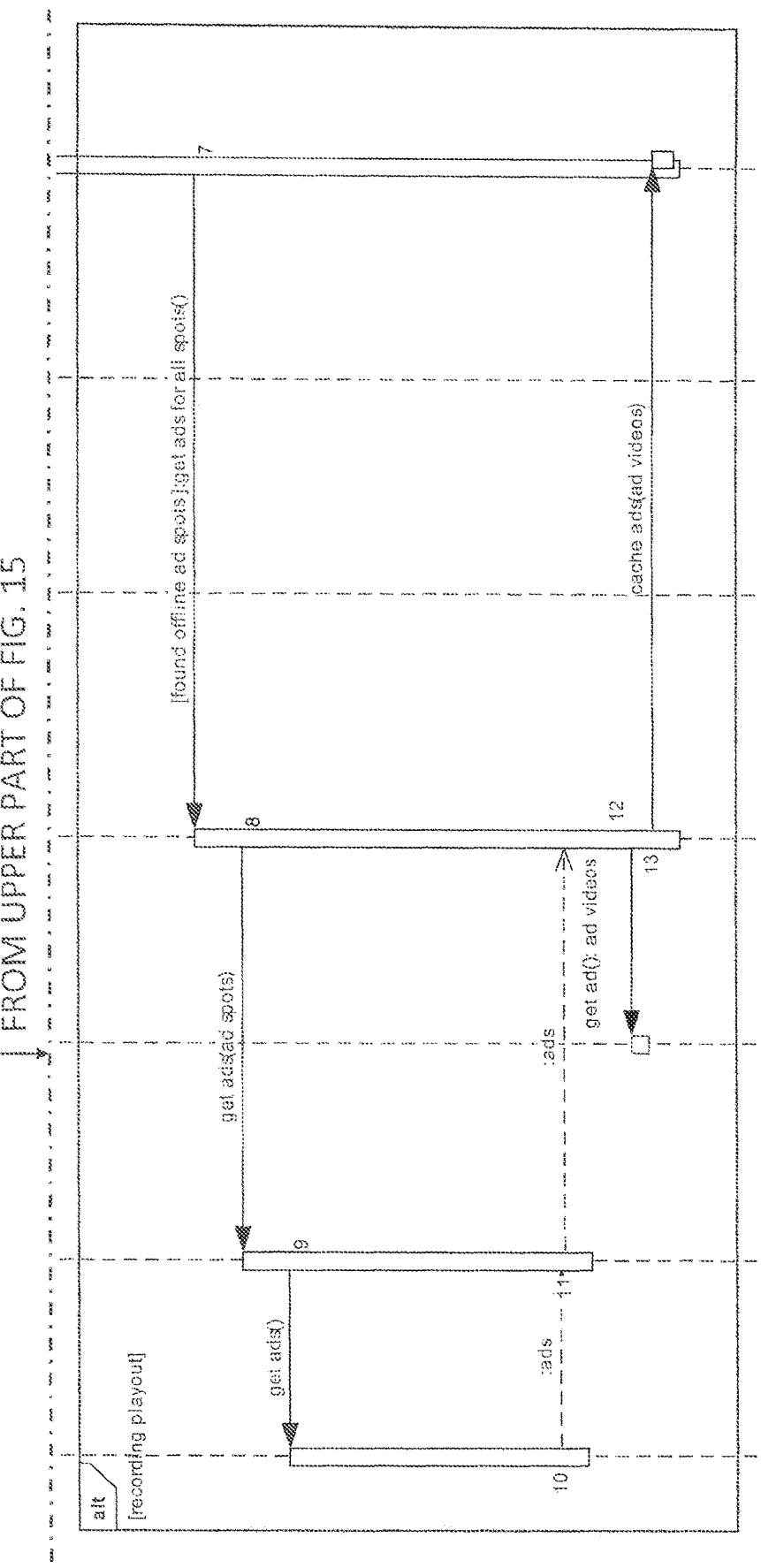

Reference is made now to the diagram of FIG. 15 which illustrates local caching and multicast transport aspects of Use-Case 4. More specifically FIG. 15 illustrates selection of the transport and pre-caching event sequence. Pre-caching of the most anticipated ad videos on the local CDN is described in the Ads for Live TV with DVR-based Caching use-case and is not repeated here.

Ad Decision Engine running on the set-top box in conjunction with the Ad Services System may periodically request from the Ad Management System an ad for pre-roll caching to speed up recording playout. Mid- and post-roll ad is pre-cached on recording play-back. The ad videos for pre-roll are pre-cached using the following criteria in order of priority: (1) Availability of the next episode of the existing series recordings; (2) New recording availability; (3) Recording viewership stats; and (4) Date change. If pre-acquisition of the ad spot list was not possible, all ads will be requested during recording playout.

Flow: Ad Impression

Figure 16:
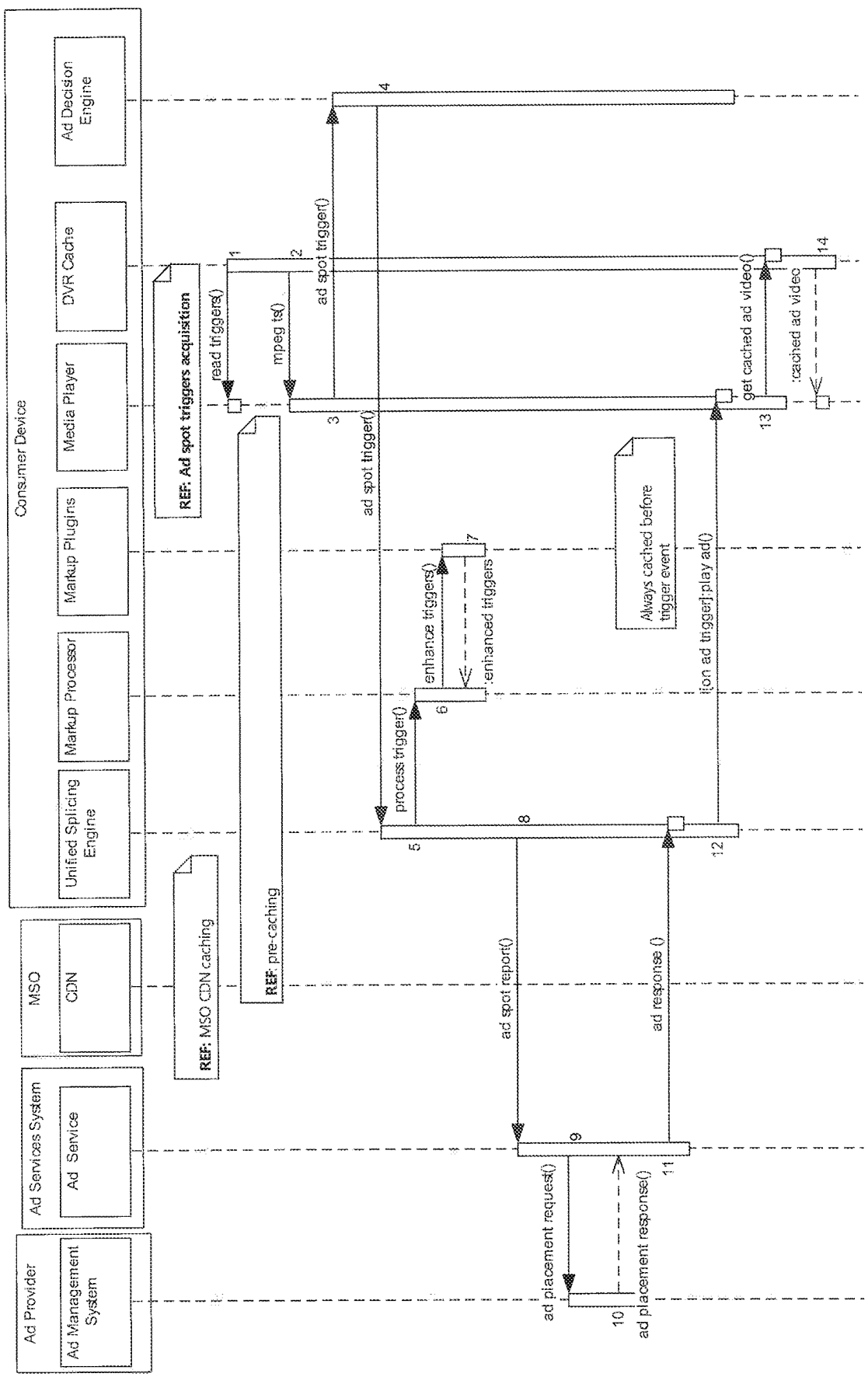
FIG. 16 is a diagram of Use-Case 4: Ad insertion into playout of locally stored DVR recordings (Flow initiated by ad spot trigger).

Reference is made now to the diagram of FIG. 16 which illustrates flow initiated by ad spot trigger aspect of Use-Case 4. More specifically, FIG. 16 illustrates Ad Impression flow. Media Player communicates playout start to the Unified Splicing Engine. Unified Splicing Engine retrieves ad trigger associated with a recorded program being played. Unified Splicing Engine commands the Markup Processor to enhance the trigger with data required for Ad Management System to respond to the ad spot opportunity. Markup Processor relays enhanced trigger to the Ad Services System. Request is sent to Ad Services System for real time ad decision.

Based on the audience measurement and information contained in the enhanced trigger, the Ad Services System constructs request to the Ad Management System and sends it out. Ad Management System replies with the following information: What ad videos the consumer device is required to play from the previously filled MSO CDN cache or local cache in the consumer device's local storage; and What are the fallback ad videos in case the required ad videos are not cached.

The Ad Services System relays the response to the Unified Splicing Engine. Upon recording playout start, the Unified Splicing Engine on the consumer device caches ad videos on the local storage. If video is cached, then Unified Splicing Engine commands a Media Player to play that ad video by splicing it into the recorded program being played. If video is not cached or consumer device failed to acquire a unicast stream from CDN, the Unified Splicing Engine commands the Media Player to play preferred default ad video available in the local DVR cache (local storage). Regarding Flow Impression Reporting, it is the same as in the use case of Live Video with local DVR cache use case and a separate description is not provided.

Use-Case 5: Ad Insertion into Playout of Premium VOD Content

This section discloses an example use-case application of the present invention for inserting ad videos into featured VOD content which does not carry embedded ad spot markup. Such scenario is usually applicable for the premium VOD content (featured movies) which is ingested by service provider directly from the VOD content providers and is not recorded from live broadcast streams. Typically, such content does not carry ad spot triggers markup. Content providers, when interested in dynamic ad insertion provide breakpoint information during VOD ingest process. Information is ingested into Ad Service and Ad Decision Management System via out of band ingest.

In the prior art pre-roll ad video insertion presents substantial challenge. This is because there is a limited lead time available to pre-buffer ad content delivered via unicast. Ad insertion into the VOD and Cloud DVR content playout has been traditionally performed as network-based ad insertion through SCTE-130 based campaign management systems tightly coupled with the corresponding VOD or Cloud DVR back-office through vendor specific ADM component. Scope of this document is limited to client-based ad video insertion.

Figure 17:
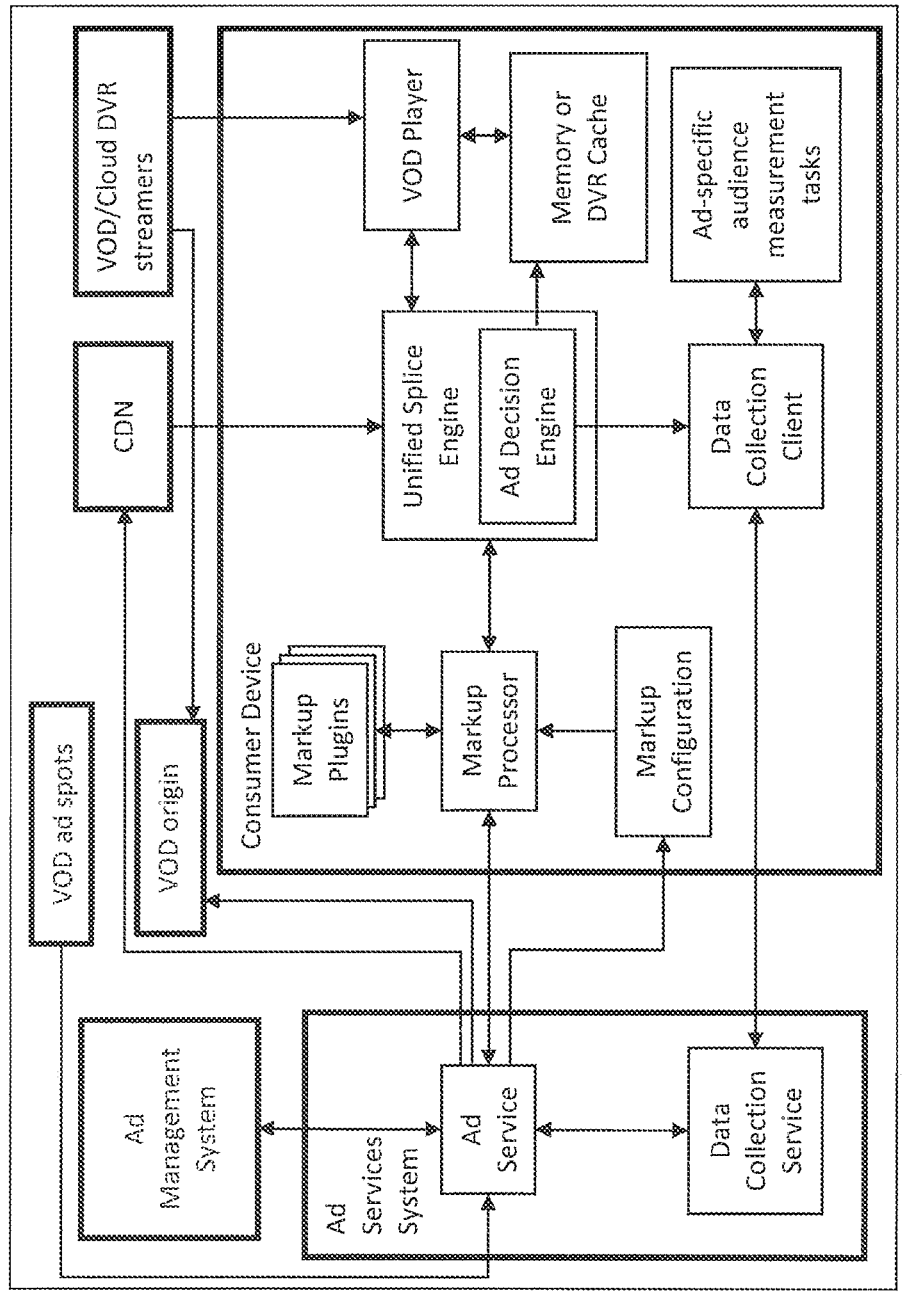
FIG. 17 is a diagram of Use-Case 5: Ad insertion into playout of premium VOD content.

Reference is made now to FIG. 17, which is a diagram of Use-Case 5: Ad insertion into playout of premium VOD content. The architecture diagram of FIG. 17 illustrates structural components supporting solution of the above noted prior art drawbacks by the invention. Detailed explanation of each flow is provided below.

This aspect of the invention provides the following methods of ad spots set creation: Out of band ingestion of the ad spot information (also known as break point information) into Ad Service and Ad Management System; and for the recorded programs that do not have out of band ad spot information, a method of automatic rules-based generation of ad spots is provided. It should be noted that VOD Player is used in place of a generic Media Player to specifically reference the VOD use.

Offline Acquisition of the Out of Band Ad Spot Triggers

Figure 18:
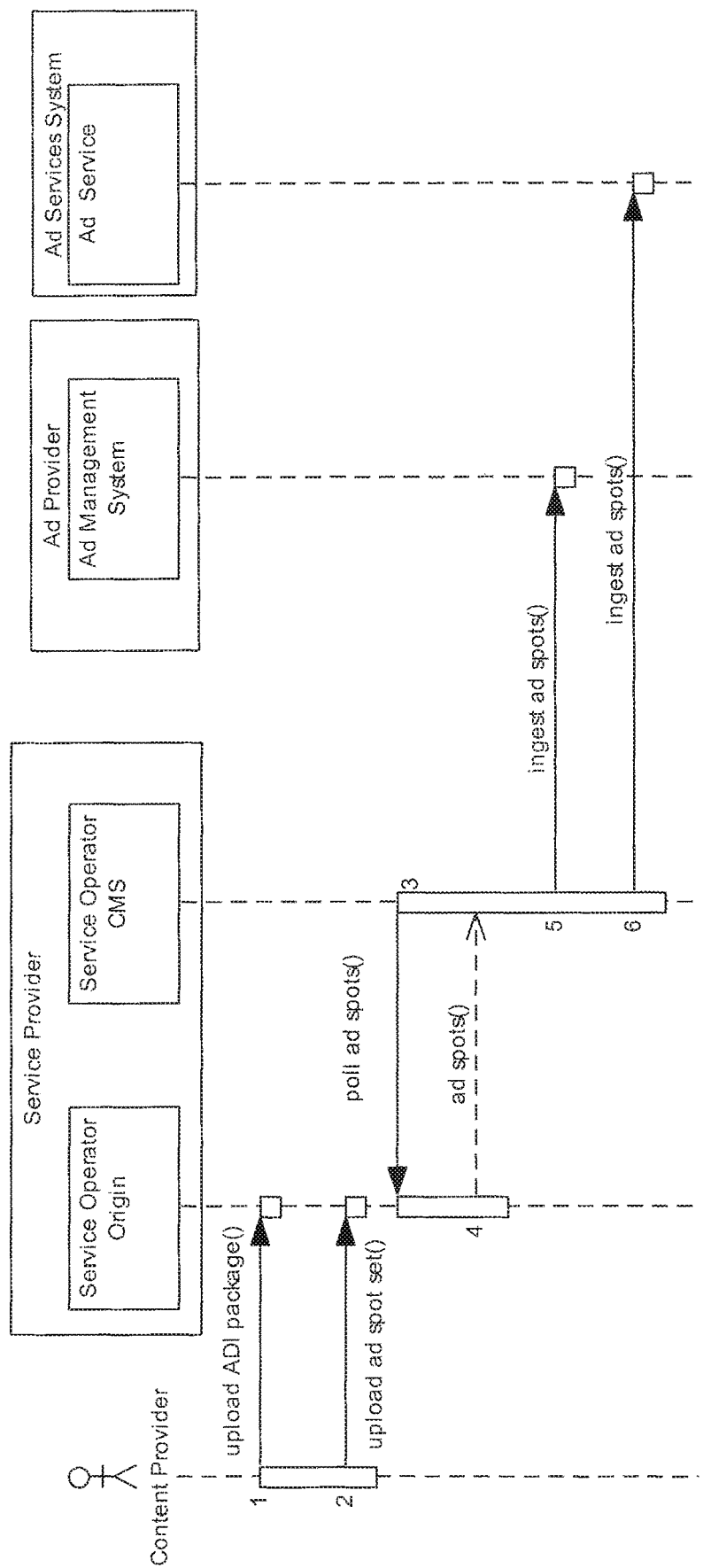
FIG. 18 is a diagram of Use-Case 5: Ad insertion into playout of premium VOD content (Offline ad spot ingest).

Reference is made now to the diagram of FIG. 18 which illustrates offline ad spot ingest process aspect of Use-Case 5. For the Live-to-VOD and cloud DVR with shared copies of the recorded programs, offline collection of the ad spot set is performed as described below. For the unique copy cloud DVR scenario such collection creates high overhead, therefore pre-caching of ad assets is not performed, and ad videos are accessed in real time on incoming ad spot trigger.

Caching Flow for when Offline Ad Spot Information is Available

Caching flow of the ad videos is identical to that of the Cloud DVR and Live to VOD use case and is not described here. It is essential that for the Ad Service plugin implementing VAST protocol, ad assets are directly available either as embedded into VAST response or as redirect instruction for retrieval from CDN.

Ad Service performs the necessary URL translation when Service Provider's CDN is used for caching of ad videos. In case of SCTE-130 signaling plug-in Ad Service relies on the SCTE-130 extensibility interfaces to provide the ad videos URL information for caching and real time retrieval.

Impression Flow

Figure 19B:
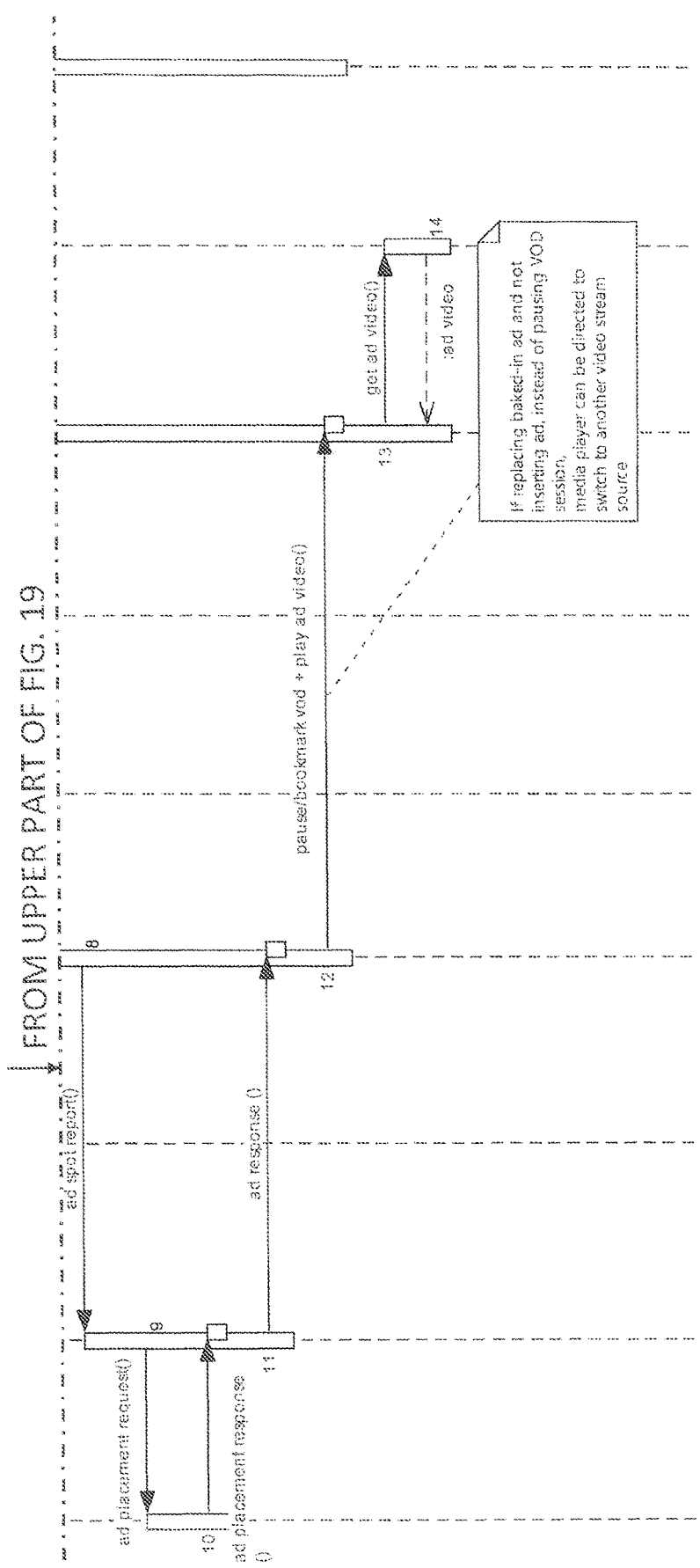

Reference is made now to FIG. 19 which illustrates VOD playout impression aspect of Use-Case 5. More specifically FIG. 19 represents the sequence of events associated with reporting ad impression associated with the Premium VOD dynamic ad insertion. VOD Player communicates playout start to the Unified Splicing Engine. Unified Splicing Engine retrieves set of ad triggers associated with a recorded program being played from Ad Service. Ad triggers have been ingested into Ad Service as part of premium VOD content ingest process. Unified Splicing Engine commands the Markup Processor to enhance the trigger with data required for Ad Management System to respond to the ad spot opportunity.

Markup Processor relays enhanced trigger to the Ad Services System. Request is sent to Ad Services System for real time ad decision. Based on the audience measurement and information contained in the enhanced trigger, the Ad Services System constructs request to the Ad Management System and sends it out.

Ad Management System replies with the following information: What ad videos the consumer device is required to play from the previously filled Content Provider's CDN cache or local cache in the consumer device's local storage; and What are the fallback ad videos in case the required ad videos are not cached.

The Ad Services System relays the response to the Unified Splicing Engine. Upon recording playout start, the Unified Splicing Engine on the consumer device caches ad videos in memory cache. On reaching ad spot, if video is cached, then Unified Splicing Engine commands the VOD Player to pause VOD session and play that ad video by splicing it into the VOD program being played. If ad video is replacing baked in ad, then original VOD session stream is not paused but is disconnected from the video presentation. Spliced ad is connected instead. If video is not cached or consumer device failed to acquire a unicast stream from CDN, the Unified Splicing Engine commands the VOD Player to play preferred default ad video available in the local DVR cache (local storage).

Reporting flow in this process is the same as in the use case of Live Video with local DVR cache. Therefore, separate description of this flow reporting is not provided.

Use-Case 6: Live-TV Ad Insertion with QAM Delivered Ad Assets

This section discloses an example use-case application of the present invention for inserting ad videos into live TV streams watched simultaneously by large population of consumer devices with limited broadband IP connectivity and without a local storage capable of caching meaningful number of ad videos. It is applicable to consumer devices with limited performance and network capabilities, or cases where the operator network is also limited by IP network bandwidth.

Hundreds of thousands and even millions of consumers are watching TV at the same time during peak hour or highly popular shows such as sports, etc. Consumer devices with limited broadband IP connectivity cannot retrieve ad videos in real time using IP unicast channel due to device or network limitation. Consumer devices without meaningful amount of local storage have no capacity for pre-caching necessary variety of ad assets locally. Ad placement opportunities in live recordings announced only few seconds before an ad spot on each channel (SCTE-35 trigger in MPEG-TS). Ad triggers may also be unreliable. Current infrastructure has challenges in supporting many individual targeted ad videos at the same time. All viewers on the same channel will have an ad spot at the same time. Ad blocks on different channels may be scheduled for the same moment in time. All viewers across all such channels have an ad spot displayed at the same time (and receive triggers at their Consumer Devices few seconds ahead of an ad spot).

Reference is made now to FIG. 20, which is a diagram of Use-case 6 System Architecture, providing solution to the above noted prior art drawbacks. Ad Campaign Management System is provided with audience measurement data properly transformed to ensure sensitive data assets are controlled by the service provider from the entire Consumer Devices footprint on an ongoing basis. Existing data collection mechanism is reused to collect required data such as what program on what channel and when is being watched and on what consumer device.

Consumer devices are allowed to request ad videos ahead of time based on configurable period-of-time or based on a real-time event. Alternatively, meta-data describing ad video schedule may be delivered to the consumer device under control of the Ad Services system. Each consumer device can periodically (once in an hour, for example) request the list of the most anticipated ad videos from Ad Provider for the next 24 hours or some other configurable frequency as determined by the network conditions, available transports, and other applicable factors. Additionally, a consumer device may make a real-time request based on a configurable real-time event such as a channel tune or ad trigger marker received. Alternatively, the Ad Services system may deliver meta-data describing anticipated ad videos.

The Ad Service must monitor the above-noted requests, identify the same ad videos requested from different consumer devices, and initiate caching of the most requested ad videos. Ad Service initiates caching of all ad assets on CDN for scheduled delivery to Consumer Device. The response from Ad Provider to the Consumer Device request for the list of ads must allow the Ad Service to identify the same ad assets scheduled for different consumer devices. The response from Ad Provider must also contain targeting information (see below). Specifically, for delivery to consumer devices which do not have, or limited, broadband IP connectivity and are therefore capable of video delivery using QAM transport only Ad Decision Engine will utilize IPstream to QAM gateway to start multiplexing of the ad video into MPEG TS. MPEG TS will feed edge QAM for retrieval by the consumer devices which have none, or limited, broadband IP connectivity or DVR storage.

Impression Flow for Ad Content Delivery Using Edge QAM Transport Impression Flow Reference is made now to FIG. 21 which illustrates impression flow aspect of Use-Case 6. More specifically, FIG. 21 illustrates sequence of events associated with QAM based ad splicing of the invention.

The Unified Splicing Engine receives an original as spot trigger from live stream as it was inserted by live stream origin. The Unified Splicing Engine uses a probability configuration as provided by Ad Services System (see below) to decide whether trigger will be relayed to Ad Service. The probability configuration contains probabilities for each live stream for a trigger to be relayed to Ad Services System.

If trigger is conditionally delivered to the Ad Services System, the Unified Splicing Engine commands, prior to delivery, the Markup Processor to enhance the trigger with data required for an Ad Management System to respond to the ad spot opportunity and for Ad Services System to calculate the probabilities (see below) using Markup Plugins. Markup Processor relays enhanced trigger to the Ad Services System. Based on the audience measurement and information contained in the enhanced trigger, the Ad Services System constructs a probability configuration for the STBs to rely future ad spot triggers back to the Ad Services System.

The more consumers are expected to watch a live stream, the less probability of relying a trigger will be calculated by the Ad Services System for that channel. Only one trigger report per ad spot is processed by the Ad Services System and the rest are ignored; the probability configuration is required to minimize the number of the duplicate triggers relayed by STB population to the Ad Service. The Ad Services System sends one or more requests that corresponds to a set of consumer devices' ad requests to Ad Management System with ad spot information.

Ad Management System replies with the following information: What ad videos are required to be delivered for a given ad spot on a given live stream; What ad videos the consumer devices are required to play; and What are the fallback ad videos in case scheduled ad video is not high concurrency video and was not made available on the QAM transport.

The Ad Services System responds to the Unified Splicing Engine by inserting ad-specific triggers into the live stream or through multicast/unicast delivery transports. Insertion of the ad-specific trigger can happen either as reaction to the original trigger in the live stream or periodically based on scheduled time intervals. The Ad Services system may intelligently schedule delivery of ad content according one or more configurable rules based on patterns of traffic and/or usage.

Upon receiving ad spot trigger Ad Service will send a signal to the gateway device which transforms IP stream (which can happen to be a fragmented video) to MPEG transport stream. The following functions will be performed by Gateway device: Read ad content manifest and video or its segments from CDN; Mux video segments into MPEG stream; and Inject resulting video stream into edge QAM device for just in time delivery.

Furthermore, Gateway device may inject video streams either (a) as a main video stream on a dedicated edge QAM device or (b) as video variance PID on the edge QAM device which transmits live signal where ad spot triggers were received. Method (b) is preferred as consumer device only switches video PID in the same MPEG stream where live video is and does not need to tune to another frequency. The Unified Splicing Engine on the Consumer Device checks if required ad video is available on the multicast transport or cached in memory. Reporting flow in this application is the same as in the use case of Live Video with local DVR cache. Thus, separate description of the reporting flow function is not provided.

What is claimed is:

1. A method for providing a unified video stream to a consumer device, the unified video stream including a video content item watched by a user and advertisement videos from multiple origins spliced into targeted ad spots in the video content item, the consumer device, the multiple origins, and a server forming a network, the method comprising:
    at least one video cache, forming part of the consumer device, receiving a plurality of advertisement videos from the multiple origins via one or more corresponding origin plugins;
    at said at least one video cache, caching said received plurality of advertisement videos, such that the cached advertisement videos are accessible for seamless splicing and time-ordering thereof into the targeted ad spots;
    analyzing, at an ad service of an ad services system of the server, an available advertisement inventory;
    generating, at said ad services system, an updated markup configuration, said generating being based on ad target population segmentation rules, prior to an expected available ad spot in the video content item;
    providing said updated markup configuration from said ad services system to the consumer device, thereby to provide at least one of a chain of markup rules for selection of advertisements from one or more allowed origins, segmentation rules based on geo-location, rules based on one or more obfuscated user profiles, and rules based on capabilities of said consumer device;
    when new markup executable plugins become available, at said ad service of said ad services system, dynamically refreshing said markup configuration;
    selecting, by an ad decision engine forming part of the consumer device, advertisement videos to be spliced into the targeted ad spots, said selecting being based on said markup configuration, instructions provided by said ad service, a state of available video origins of said multiple origins, and said at least one cache, and based on a pre-defined ad targeting mechanism;
    at a splicing engine forming part of the consumer device and functionally associated with said at least one cache, filtering ad triggers received from the multiple origins, and providing the filtered ad triggers to a markup processor of the consumer device for enrichment with targeting information;
    at said markup processor, enriching said filtered ad triggers utilizing one of said markup plugins in a flexible sequence determined by said markup configuration;
    processing video triggers and splicing said selected advertisement videos into said targeted ad spots, by said splicing engine, said splicing including controlling video splice events to ensure temporal ordering of video content in the unified video stream;
    displaying said unified video stream by a media player functionally associated with said splicing engine;
    collecting ad impressions data and user behavioral information by a client-side data collection service forming part of the consumer device; and
    providing said collected ad impression data and user behavioral information to a server-side data collection service forming part of the server.

2. The method of claim 1, further comprising:
    providing a probability configuration from said ad services system to said splicing engine; and
    at said splicing engine, using said probability configuration to determine whether to relay a specific ad trigger to said ad service.

3. The method of claim 2, wherein said probability configuration includes, for each line channel origin of said multiple origins, a probability for an ad trigger to be relayed to said ad services system.

4. The method of claim 2, further comprising, at said ad services system, computing said probability configuration based on video content consumption statistics collected by said server-side data collection service.

5. The method of claim 1, further comprising using said markup configuration, controlling insertion of ads into the video content item regardless of the identity of the video content item and regardless of a mechanism by which an ad is delivered.

6. The method of claim 1, further comprising, at said ad service and ahead of said splicing, controlling information received from said multiple origins, and wherein said caching of said received plurality of advertisement videos is based on knowledge of a configuration of the network, consumer behavior, a profile and hardware capabilities of the consumer device, and said pre-defined ad targeting mechanism.

7. The method of claim 1, further comprising, at a time of splicing of an ad targeted to a group of consumer devices, controlling priming of at least one multicast transport by said ad service.

8. The method of claim 1, wherein said markup configuration is plugin based, and is implemented using markup that abstracts access of said media player to said multiple origins and to said at least one video cache.

9. The method of claim 1, wherein said selecting advertisement videos comprises selecting said advertisement videos to minimize at least one of network traffic and a computational burden on the consumer device.

10. The method of claim 1, further comprising:
    targeting ad videos to an arbitrary consumer group which includes one or more consumers; and
    controlling multi-cast playback of said ad videos to said arbitrary group of consumers by said ad service, such that said playback is aligned with a scheduled ad spot.

11. The method of claim 1, further comprising aggregating information in said server-side data collection service by said ad services system, before providing said information to said ad management system.

12. The method of claim 1, wherein said at least one cache of said consumer device includes only a RAM (Random Access Memory) buffer, the method further comprising:
    at said ad services system, scheduling delivery of ad content to the consumer device according to one or more configurable rules which are based on traffic patterns in the network; and
    at said consumer device, only caching a specific ad in said RAM buffer if said specific ad is not available in a multicast transport.

13. The method of claim 1, wherein the video content item comprises locally recorded DVR content, the method further comprising:
- at said consumer device, capturing ad spots during recording of said recorded DVR content; and
- at said consumer device, using said captured ad spots for pre-caching of ads prior to splicing thereof.

* * * * *